US007325922B2

(12) United States Patent
Spivey

(10) Patent No.: US 7,325,922 B2
(45) Date of Patent: Feb. 5, 2008

(54) ADJUSTABLE FOCUS EYEGLASSES

(75) Inventor: Brett Spivey, Carlsbad, CA (US)

(73) Assignee: Quexta, Inc, Carlsbad, CA (US)

( * ) Notice: Subject to any disclaimer, the term of this patent is extended or adjusted under 35 U.S.C. 154(b) by 0 days.

(21) Appl. No.: 11/607,130

(22) Filed: Nov. 29, 2006

(65) Prior Publication Data

US 2007/0091257 A1 Apr. 26, 2007

Related U.S. Application Data

(63) Continuation-in-part of application No. 11/085,436, filed on Mar. 21, 2005, which is a continuation-in-part of application No. 11/243,944, filed on Oct. 5, 2005, now Pat. No. 7,232,217, which is a continuation-in-part of application No. 11/387,023, filed on Mar. 21, 2006, which is a continuation-in-part of application No. 11/580,389, filed on Oct. 14, 2006.

(51) Int. Cl.
*G02C 7/06* (2006.01)

(52) U.S. Cl. .......................... 351/159; 351/54; 351/55; 351/172

(58) Field of Classification Search .................. 351/54, 351/55, 57, 159, 172
See application file for complete search history.

(56) References Cited

U.S. PATENT DOCUMENTS 1,948,636 A 2/1934 Tillyer
3,507,565 A 4/1970 Alvarez
3,617,116 A 11/1971 Jones
5,644,374 A * 7/1997 Mukaiyama et al. ....... 351/169
7,232,217 B2 * 6/2007 Spivey ....................... 351/159

* cited by examiner

*Primary Examiner*—Scott J. Sugarman
(74) *Attorney, Agent, or Firm*—John R. Ross

(57) ABSTRACT

Adjustable focus eyeglasses with two lens units, each lens unit having two lens elements. The eyeglasses are focused by adjusting the position of at least one of the two lens elements relative to the other in a direction generally perpendicular to a viewing direction. The relative motion can be linear or pivotal about a pivot location outside the lenses. Applicant provides basic general equations defining the thickness profiles for the lenses and the solutions to these equations are:

$$t = A[uv^2 + 2(\alpha v + 1)(\alpha u - \sin(\alpha u))/\alpha^3] + B[2(\alpha v + 1)(1 - \cos(au))/\alpha^2)] + C(v\sin(au)/\alpha - (\alpha u - \sin(\alpha u))/\alpha^2)] + Du + E + F(v) + F1(u, v)u^4 + F2(v)u^3 v + F3(v)u^2 v^2 + F4(v)uv^3,$$

where
A for one of the lenses elements is −A for the other lens element in each lens unit and
F(v), F1(u,v), F2(v), F3(v), F4(v)
are any functions over the area of the lenses for which derivatives up to at least third order are continuous. At least one of F1(u,v), F2(v), F3(v), F4(v) is non-zero.

53 Claims, 18 Drawing Sheets

FRONT LENS UP, REAR LENS DOWN

FRONT AND REAR LENSES ALIGNED 0 diopter setting 1 diopter setting 2 diopter setting 0 diopter setting 1 diopter setting 2 diopter setting 0 diopter setting (Alvarez form)

1 diopter setting (Alvarez form)

2 diopter setting (Alvarez form)

FIG. 5A
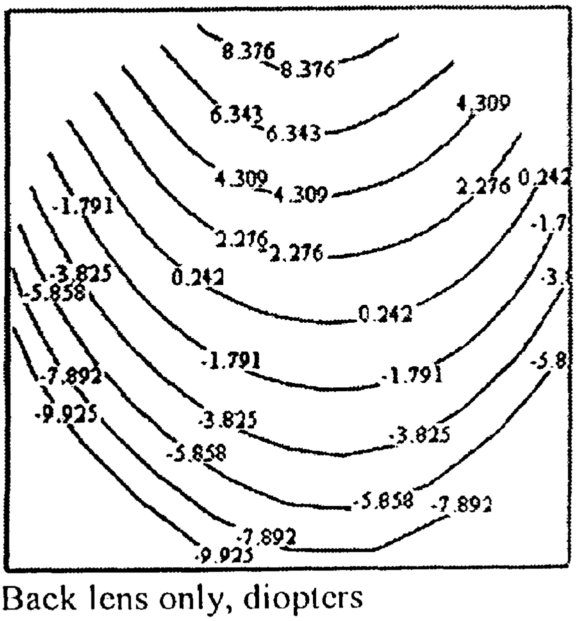
Back lens only, diopters
FIG. 5B
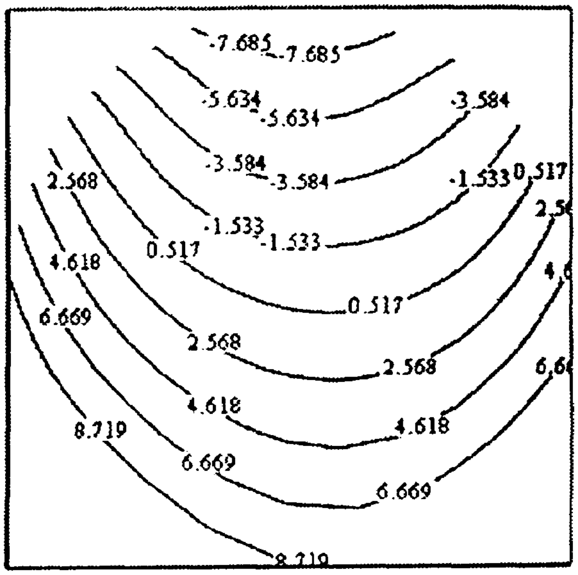
Front lens only, diopters
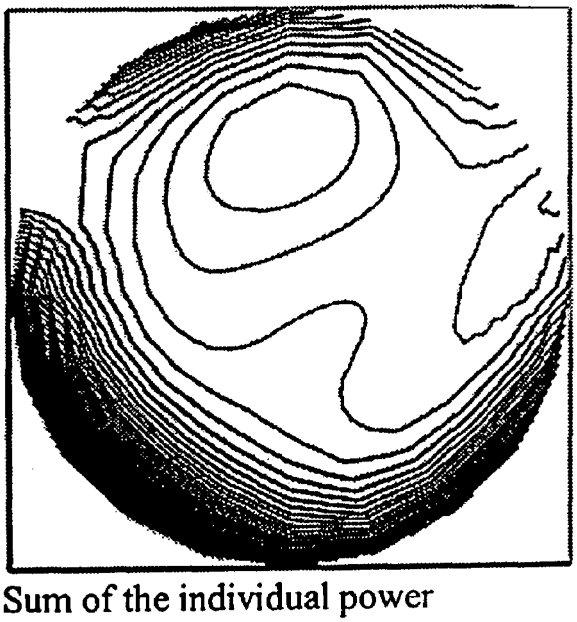
Sum of the individual power
FIG. 6A
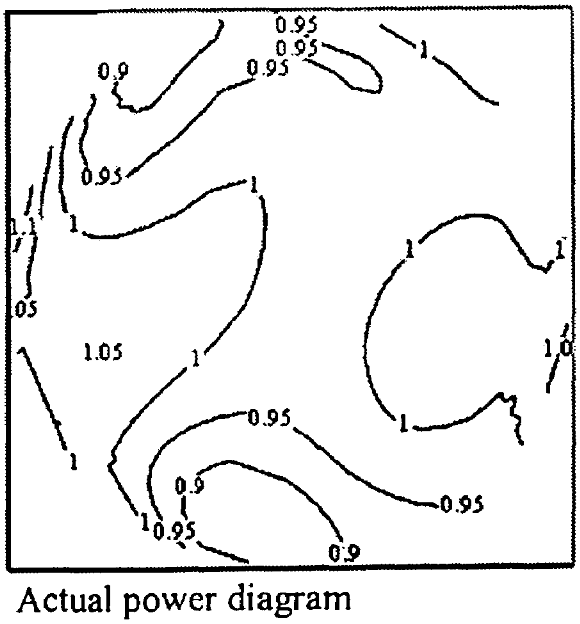
Actual power diagram
FIG. 6B

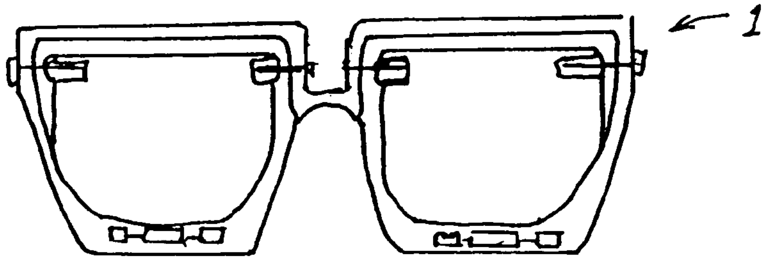
FIG. 7A
FIG. 7B
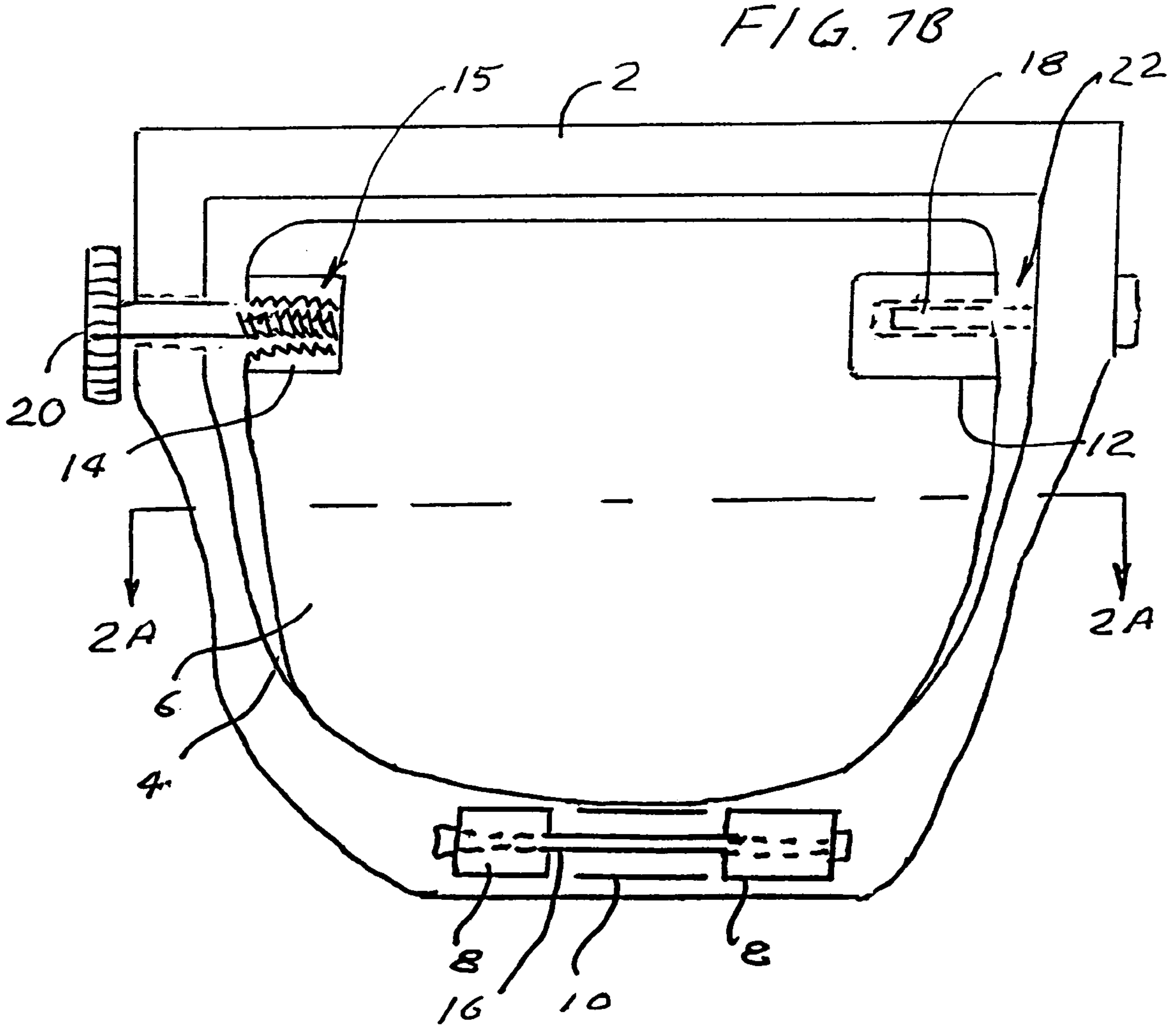

Back Lens Assy
FIG. 9C
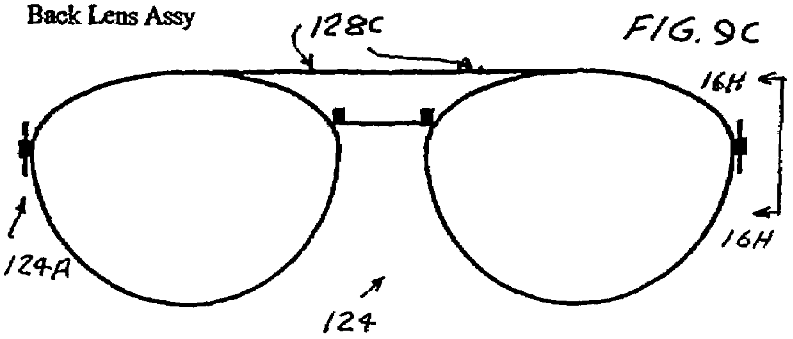
FIG 9H
FIG. ~~16H~~ 9H
Front Lens Assy
FIG. 9D
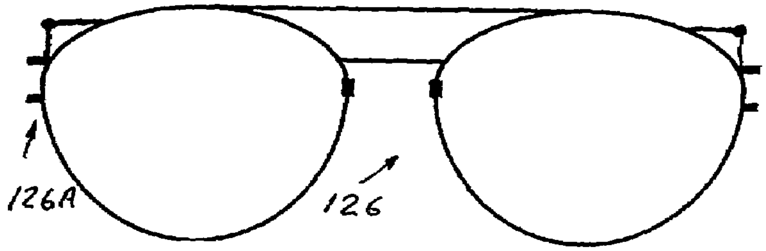
Nose Piece Assy
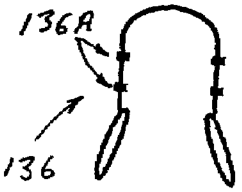
FIG. 9I
Front View Position 1, Front Lens Down
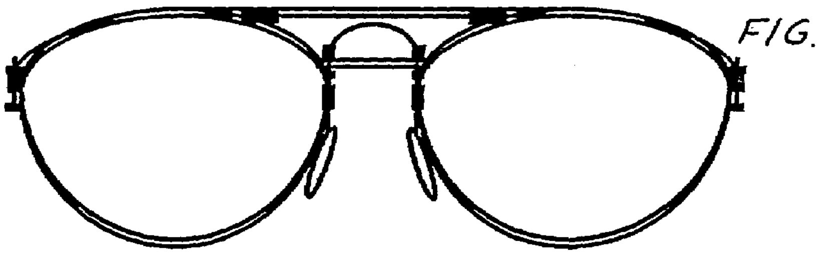
FIG. 9E
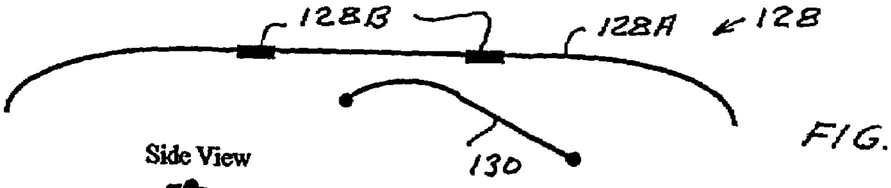
FIG. 9F
Side View
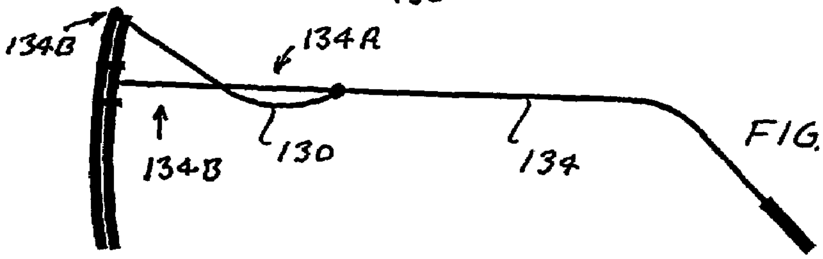
FIG. 9G

LENSES ALIGNED 92L pivot mount
94L pivot screw
84
86
90 temple screw
90 temple screw
74
72
70
82
80

72 rear frame
70 front frame
98L
96L
98R
96R
FRONT LENS DOWN, REAR LENS UP 98L rear lens
96L front lens
72
70
74 base frame
82 right rear temple
76 right base temple
80 right front temple 94L
84 left front frame temple
86 left rear frame temple

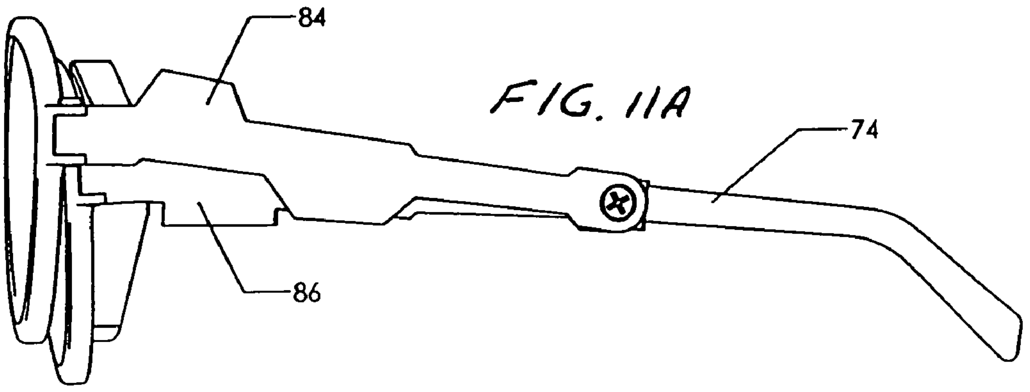
FRONT LENS UP, REAR LENS DOWN
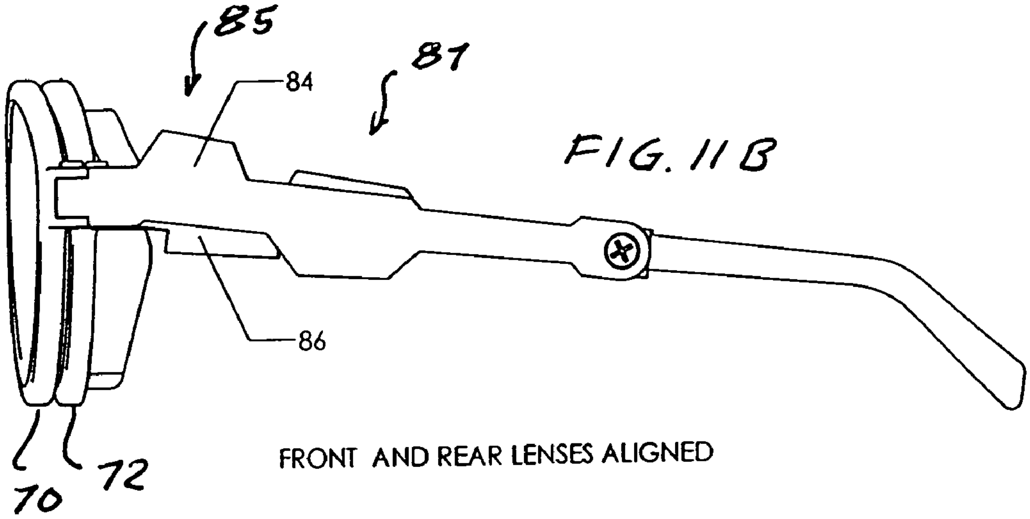
FRONT AND REAR LENSES ALIGNED
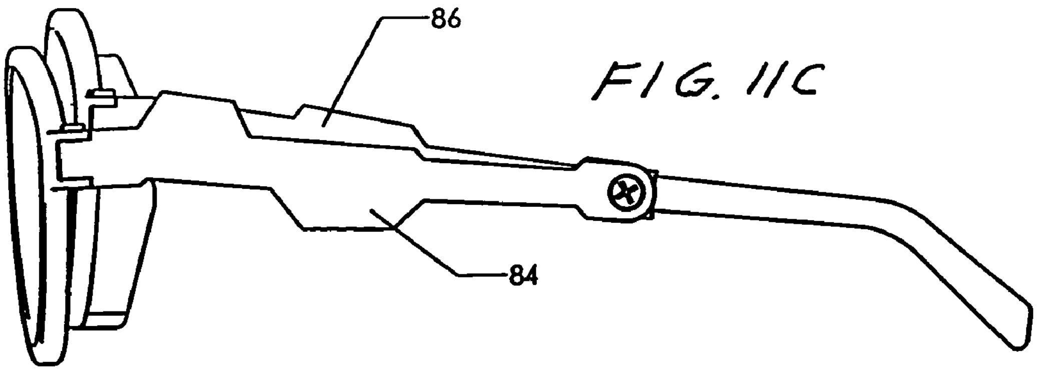
FRONT LENS DOWN, REAR LENS UP

60
FRAMES ALIGNED

60
FRONT FRAME UP
REAR FRAME DOWN

CAM
FRONT FRAME DOWN
REAR FRAME UP 62 base frame
60 cam
66 front frame
64 rear frame
68 pivot FIG. 13A
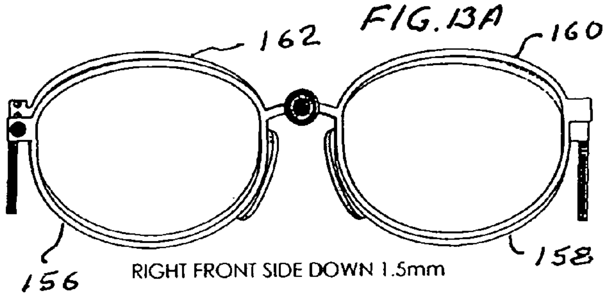
RIGHT FRONT SIDE DOWN 1.5mm
FIG. 13D
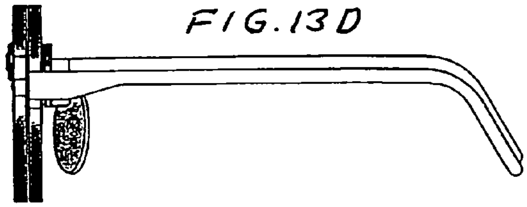
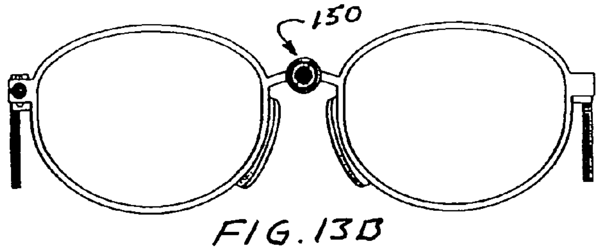
FIG. 13B
FIG. 13E
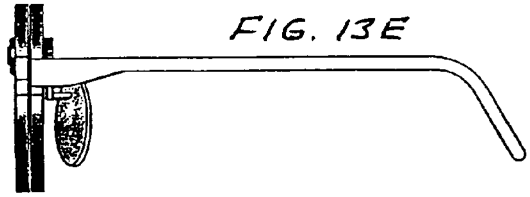
FIG. 13C
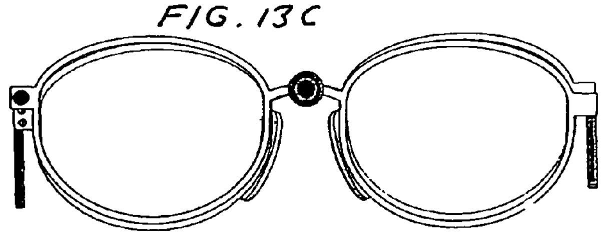
LEFT FRONT SIDE DOWN 1.5mm
FIG. 13F
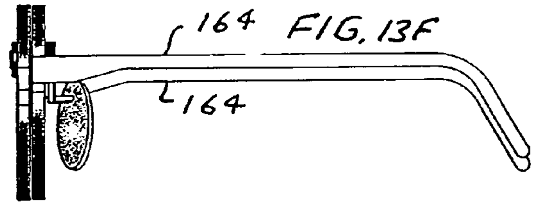
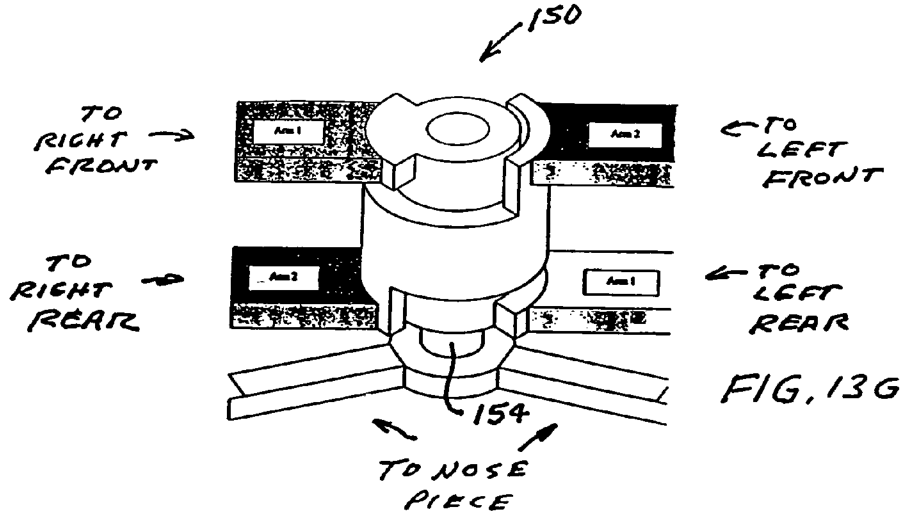
FIG. 13G

FRONT LENSES UP

FRONT LENSES DOWN

ADJUSTABLE FOCUS EYEGLASSES

This application is a continuation in part of U.S. patent application Ser. No. 11/085,436 filed Mar. 21, 2005 Ser. No. 11/243,944 filed Oct. 5, 2005, now U.S. Pat. No. 7,232,217 Ser. No. 11/387,023 filed Mar. 21, 2006 and Ser. No. 11/580,398 filed Oct. 14, 2006, each of which are incorporated herein by reference. This invention relates to eyeglasses, in particular to adjustable focus eyeglasses, and to processes for making adjustable focus eyeglasses.

BACKGROUND OF THE INVENTION

Nearsightedness and Farsightedness

Nearsightedness is a condition of the eye in which distance objects cannot be focused on the retina and farsightedness is a condition of the eye in which near objects cannot be focused on the retina. These conditions are normally corrected by eyeglasses lenses having a power needed to correct the eye's focus error.

Astigmatism

Astigmatism is a condition of the eye caused by an irregular curvature of an eye surface, usually the front surface. It can be corrected by an eyeglasses lens in which at least one surface has a different curvature in different planes through the lens axis.

Thin Lenses

In ophthalmology and optometry it is customary to specify the focal length of spectacle lenses in diopters. The power P of any lens in diopters D is defined as the reciprocal of the focal length f in meters (i.e. P=1/f). For thin lenses, the power P of a two lens ($P_1$ and $P_2$) stacked combination is the sum of the power of the two lenses (i.e., $P=P_1+P_2$) Stacking of two thin lenses 1 and 2 where $P_1=-P_2$ would produce a power of zero, equivalent to a flat plate. The two lenses do not perfectly cancel, but as long as the power is fairly weak (i.e., less than about 5 diopters), the human eye does not detect the residual aberration.

The Human Eye

The adjustable lens of the human eye, called the "crystalline lens", is located immediately behind the iris. The crystalline lens is comprised of 4 layers, from the surface to the center: the capsule, the sub-capsular epithelium, the cortex and the nucleus. The lens capsule is a clear, membrane-like structure that is quite elastic, a quality that keeps it under constant tension. As a result, the lens naturally tends toward a rounder or more globular configuration, a shape it must assume for the eye to focus at a near distance. Slender but very strong suspending ligaments, which attach at one end to the lens capsule and at the other end to protrusions of the circular ciliary body around the inside of the eye, hold the lens in place. When the ciliary body relaxes, the protrusions pull on the suspending ligaments, which in turn pull on the lens capsule around its equator. This causes the entire lens to flatten or to become less convex, enabling the lens to focus light from objects at a far away distance. Likewise when the ciliary muscle contracts, tension is released on the suspending ligaments, and on the lens capsule, causing both lens surfaces to become more convex again and the eye to be able to refocus on near objects. This adjustment in lens shape, to focus at various distances, is referred to as "accommodation". The "amplitude of accommodation" of an eye is the maximum amount that the eye's crystalline lens can accommodate. This amount is very high when young and decreases with age.

The cornea of the human eye is also important in providing focus. In fact, the cornea provides by far the greatest optical power in the eye, with a power of 43.0 D. The entire optical system of the eye has a power of 58.6 D. This causes the light entering the eye to focus onto the retina. The power of the cornea cannot be adjusted, except by surgery.

Presbyopia

After age 40 in most people (and by age 45 in virtually all people) a clear, comfortable focus at a near distance becomes more difficult with eyes that see clearly at a far distance. This normal condition is known as "presbyopia", and is due both to a lessening of flexibility of the crystalline lens and to a generalized weakening of the ciliary muscle. By the time one reaches 65 or so, the crystalline lens is virtually incapable of changing shape. Unless one is nearsighted, it is not possible to focus objects (such as a printed page) clearly at even an arm's length distance. The amount of presbyopia inevitably increases with age. Eyeglasses are usually used to provide correct focus as needed. These eyeglasses include bifocal, trifocal, and continuous focal glasses. Other solutions include separate glasses for distance and reading.

Attempts have been made to design glasses providing adjustable focus. Suggested techniques include: (1) pumping a clear fluid between thin lenses that bulge with increasing pressure (U.S. Pat. No. 2,567,581), (2) use of voltage controlled liquid crystal nematic material to change refractive indexes (U.S. Pat. No. 5,359,444) and (3) use of a variety of pixilated electro-active materials (U.S. Pat. No. 6,733,130). These prior art patents are incorporated herein by reference. These prior art patents disclose techniques for finding automatic focus settings for these glasses. These techniques include range finders and small camera viewing of both eyes to detect distances being observed. These prior art patents also describe small processors and drivers to control focus based on estimates of the distances.

Bifocals, trifocal and continuous focus glasses all have their problems as is well known by the people who wear them, and the automatic focus glasses have not been successful in solving the problems. Surgery can correct vision problems in many cases, but eye surgery is expensive and many people who can afford eye surgery, prefer to avoid it.

Alvarez and Mukaijama Adjustable Focus Patents

Luis W. Alvarez patented an adjustable focus lens system in 1967 (U.S. Pat. No. 3,305,294) and another in 1970 (U.S. Pat. No. 3,507,565). These patents describe lens systems comprised of two complementary lenses. Combining the two lenses produced a lens unit with a focus that could be adjusted by relative motion of the two lenses in an x direction (i.e. linear direction) perpendicular to a viewing direction. These adjustable focus lenses have thickness t described by the equation:

$$t=A(xy^2+\tfrac{1}{3}x^3)+Bx^2+Cxy+Dx+E+F(y),$$

or equivalently the by system of relations:

$$\partial^3 t/\partial x^3=2A,$$

$$\partial^3 t/\partial x\partial y^2=2A, \text{ and}$$

$$\partial^3 t/\partial x^2\partial y=0.$$

For this we define the direction away from the face to be the z direction, the translation direction to be the x direction, and the non-translation direction to be the y direction. With this, the lens pair has a variable optical power as we translate them differentially in x. This variable power is a function of the distance that we translate the lenses. The deficiency with the Alvarez equations is that the description is too simple for optimal properties. While the equations are accurate for the region directly in front of the eyes, the glasses are deficient in a number of important optical (especially off-axis image quality) and other quality (such as thickness and weight) and aesthetic parameters.

A patent issued to Mukaiyama and others in 1997 (U.S. Pat. No. 5,644,374) describes essentially the same invention but in a different way. Applicant has determined that the optical performance for designs according to the teachings of this patent to be inadequate. That patent treats the two lenses as if they behave independently, with power and astigmatism effects essentially summing. Applicant has found this assumption to be highly inaccurate, except in the case of lenses that are so weak that they are commercially uninteresting. Also, this patent teaches that the lines of constant power should be parallel and linear, which Applicant has found not to be at all true for an optimized design.

What is needed is a better technique for solving problems of human eye focus including the problems associated with presbyopia that we will all encounter, if we live long enough.

SUMMARY OF THE INVENTION

The present invention provides eyeglasses with two lens units, each lens unit having two lens elements. A mechanism is provided to adjust the position of one of the two lens elements relative to the other in a direction generally perpendicular to a viewing direction. In a preferred set of embodiments the relative motion is linear in a single direction and in another set of embodiments the relative motion is pivotal about a pivot location outside the lenses. A specially designed thickness profile for the first lens element defines a first thickness profile and a thickness profile for the second lens element defines a second thickness profile. The designs of the specially designed thickness profiles are chosen such that small adjustments of the relative positions of the two lenses in directions perpendicular or approximately perpendicular to a viewing direction results in changes in the combined focus of the two lenses of the lens unit.

General Equations for Thickness Profiles

Applicant uses coordinates (u,v) in a plane perpendicular to the viewing direction when looking straight ahead ("on-axis"). He calls this plane the "plane of the lens". The origin point (u,v)=(0,0) is defined to be the point directly in front of the pupil when looking straight ahead. This is convenient because users in general desire better performance when the eye is looking on-axis compared to looking at an angle ("off-axis"). The u-coordinate points in the direction of relative motion of the lenses when in the null position. The v-coordinate direction is orthogonal to the u-coordinate direction, but in the plane of the lens.

The motion of the lens can either be purely in the u-direction, or rotate around an axis located at $(u,v)=(0,-r_0)$. Applicant uses a parameter $\alpha$ which is 0 in the case of translational motion, and $1/r_0$ in the case of rotation around an axis.

The basic general equations defining the thickness profiles are given by:

$$((\alpha v+1)^{-2}\partial^3 t/\partial u^3+\alpha(\alpha v+1)^{-1}\partial^2 t/\partial v\partial u)\,|_{(u,v)=(0,0)}=2A$$

$$(\partial^3 t/\partial v^2\partial u)|_{(u,v)=(0,0)}=2A$$

$$((\alpha v+1)^{-1}\partial^3 t/\partial v\partial u^2-\alpha(\alpha v+1)^{-2}\partial^2 t/\partial u^2)\,|_{(u,v)=(0,0)}=0.$$

The notation "(u,v)=(0,0)" indicates that the relations only hold for the center point (u,v)=(0,0), but not necessarily outside of that point. However, Applicant requires the thickness profile functions to be continuous, and the derivatives up to at least third order to be continuous. Applicant picks A for one lens to be the complement (negative value) of A for the other lens.

The solutions to these equations are:

$$t = A[uv^2 + 2(\alpha v+1)(\alpha u - \sin(\alpha u))/\alpha^3] + B[2(\alpha v+1)(1-\cos(\alpha u))/\alpha^2)] + C[v\sin(\alpha u)/\alpha - (\alpha u - \sin(\alpha u))/\alpha^2)] + Du + E + F(v) + F1(u,v)u^4 + F2(v)u^3v + F3(v)u^2v^2 + F4(v)uv^3,$$

where

F(v), F1(u,v), F2(v), F3(v), F4(v)

are any functions over the area of the lenses for which derivatives up to at least third order are continuous.

Translation Only Designs:

In the case of translation only designs, $\alpha=0$. Applicant has defined x=u, and y=v. He defines the origin x=0, y=0 to be the point directly in front of the pupil when looking straight ahead. The equations in this form for the translation designs are:

$$(\partial^3 t/\partial x^3)|_{(x,y)=(0,0)}=2A,$$

$$(\partial^3 t/\partial x\partial y^2)|_{(x,y)=(0,0)}=2A, \text{ and}$$

$$(\partial^3 t/\partial x^2\partial y)|_{(x,y)=(0,0)}=0.$$

Note that the Alvarez description referred to in the Background Section is the same at the center (x,y)=(0,0), but Alvarez also applies this restriction away from the center point whereas the present invention considers a wide variety of parameters to optimize the design across the entire lens profile. As above Applicant picks A for one lens to be the complement of A for the other lens.

The solution is found by taking the limit as $\alpha\rightarrow 0$ in the above thickness expression, which results in.

$$t=A(xy^2+\tfrac{1}{3}x^3)+Bx^2+Cxy+Dx+E+F(y)+F1(x,y)x^4+F2(y)x^3y+F3(y)x^2y^2+F4(y)\,xy^3.$$

This can be seen as identical to the Alvarez except for the addition of F1, F2, F3 and F4. These additional functions will be shown in this patent to be important for optimized performance.

Designs including rotation:

The relative motion perpendicular to the viewing direction may also include rotation in the plane of the lens. In this case, at least one of the lenses pivots about a pivot location. For a good solution to exist, this must be outside of the lens perimeter.

For the pivot design, we will call $r_0\theta=u$, and $r-r_0=v$, with $r_0=1/\alpha$. The origin $r=0$ is the pivot point, and $r=r_0$, $\theta=0$ is the point directly in front of the pupil when looking straight ahead. In this form, the equations are given by $$r_0^{-1}(r^{-2}\partial^3 t/\partial\theta^3+r^{-1}\partial^2 t/\partial r\partial\theta)|_{(r,\theta)=(r0,0)}=2A$$

$$r_0^{-1}(\partial^3 t/\partial r^2\partial\theta)|_{(r,\theta)=(ro,0)}=2A$$

$$r_0^{-1}(r^{-1}\partial^3 t/\partial r\partial\theta^2-r^{-2}\partial^2 t/\partial\theta^2)|_{(r,\theta)=(ro,\theta)}=0.$$

The solution in this form is $$t=Ar_0[(r^2+r_0^2)\theta-2rr_0\sin(\theta)]+B2r_0r(1-\cos(\theta))+Cr_0[r\sin(\theta)-r_0\theta]+Dr_0\theta+E+F(r)+F1(r,\theta)r_0^4\theta^4+F2(r)r_0^3(r-r_0)\theta^3+F3(r)r_0^2(r-r_0)^2\theta^2+F4(r)r_0(r-r_0)^3\theta,$$

The terms have been defined so that the constants are the same as in the general equation, but a shorter equivalent form provided below is possible by redefining the constants:

$$t=A'r^2\theta+B'r\cos(\theta)+C'r\sin(\theta)+D'\theta+E'+F'(r)+F1'(r,\theta)\theta^4+F2'(r)(r-r_0)\theta^3+F3'(r)(r-r_0)^2\theta^2+F4'(r)(r-r_0)^3\theta.$$

Choosing Parameters

The choice of parameters to the general solutions depends on desired optical performance, other restrictions such as minimum and maximum thickness and aesthetic and other considerations. These specific optimum solutions use a form much more general than that described by Alvarez. Applicant picks the parameters and functions to optimize lens properties. In preferred embodiments 17 specific parameters and functions are optimized to provide desired performance and other quality and aesthetic results.

Adjustable Frame Designs

Several specific frame designs are described. For the linear relative motion approach some designs provide for movement side to side movement of the lens elements relative to each other. In other designs the relative motion is up and down. Pivotable motion frame designs are also described. Techniques for automatic focusing of the lenses are also disclosed.

Fixed Lens Eyeglasses Utilizing the Present Invention

In other embodiments of the present invention, the lens units are first adjusted relative to each other to provide a desired focusing power then fixed in a frame to provide fixed lens units with a fixed power. When the present invention is utilized to make fixed-lens eyeglasses, a very wide variety of lens powers can be produced with a minimal stock of lenses. Astigmatism may be corrected by a small adjustment in a second direction perpendicular to the first direction followed by a rotation of the two lenses about the axis of the two lenses. When the adjustments have been made the two lenses are fixed with respect to each other and installed in eyeglass frames. Cutting to the shape of the eyeglass frames can occur either before or after the fixing.

BRIEF DESCRIPTION OF THE DRAWINGS

FIGS. 5A and 5B and 6A and 6B show features of another prior art technique.

FIGS. 7A and 7B show features of a frame design for horizontal relative lens motion.

FIGS. 9A through 9I show features of a second frame design for vertical lens motion.

FIGS. 11A through 11C show features of a fourth frame design for vertical lens motion.

FIGS. 13A through 13G show features of a frame design for pivotal lens motion.

DETAILED DESCRIPTION OF PREFERRED EMBODIMENTS

Theory

Figure 1A:
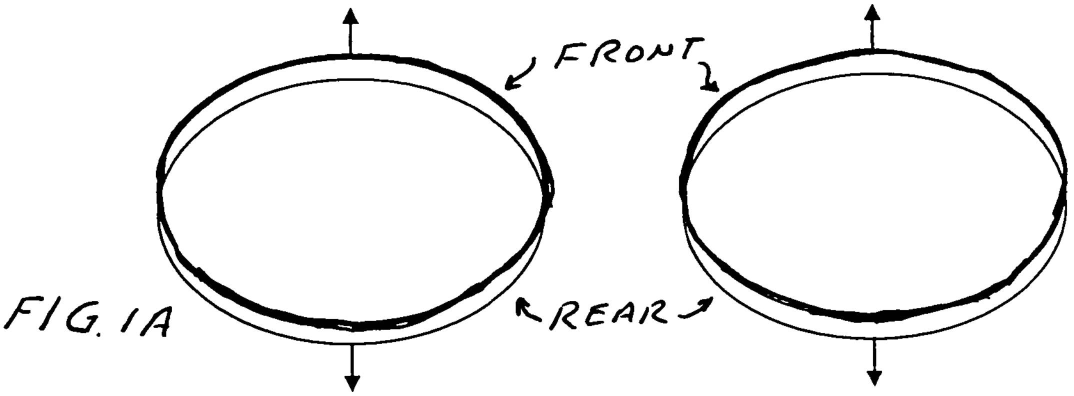
FIGS. 1A, 1B and 1C show relative movement of two lens elements in the vertical, horizontal and pivot directions.

In preferred embodiments of the present invention a mechanism is provided to adjust the position of one of the two lens elements (in each of the two lens units) relative to the other lens element in a direction generally perpendicular to a viewing direction. In a preferred set of embodiments the relative motion is linear in a single direction and in another set of embodiments the relative motion is pivotable about a pivot location outside the lenses. Examples of this relative motion are shown in FIG. 1A (vertical motion), FIG. 1B (horizontal motion) and FIG. 1C (pivotal motion). The first lens element has a specially designed thickness profile defining a first thickness profile and the second lens element has a thickness profile defining a second thickness. The thickness profiles are designed such that small adjustments of the relative positions of the two lenses in directions perpendicular or approximately perpendicular to a viewing direction results in changes in the combined focus of the two lenses of the lens units.

General Equations for Thickness Profiles

Applicant uses coordinates (u,v) defined in the plane of the lens. The origin point (u,v)=(0,0) is defined to be the point directly in front of the pupil when looking on-axis. This is convenient because users in general desire better performance when the eye is looking nearer to straight ahead. The u-coordinate points in the direction of relative motion of the lenses when in the null position. The v-coordinate direction is orthogonal to the u-coordinate direction, but in the plane of the lens.

The motion of the lens can either be purely in the u-direction, or rotate around an axis located at $(u,v)=(0,-r_0)$.

We will use a parameter a which is 0 in the case of translational motion, and $1/r_0$ in the case of rotation around an axis.

The basic general equations defining the thickness profiles are given by:

$$((\alpha v+1)^{-2}\partial^3 t/\partial u^3+\alpha(\alpha v+1)^{-1}\partial^2 t/\partial v\partial u)|_{(u,v)=(0,0)}=2A$$

$$(\partial^3 t/\partial v^2\partial u)|_{(u,v)=(0,0)}=2A$$

$$((\alpha v+1)^{-1}\partial^3 t/\partial v\partial u^2-\alpha(\alpha v+1)^{-2}\partial^2 t/\partial u^2)|_{(u,v)=(0,0)}=0.$$

The notation "(u, v)=(0,0)" indicates that the relations only hold for the center point (u,v)=(0,0), but not necessarily outside of that point. However, Applicant requires the thickness profile functions to be continuous, and the derivatives up to at least third order to be continuous. He picks A for one lens element to be the complement of the other lens element.

The solutions to these equations are:

$$t = A[uv^2 + 2(\alpha v+1)(\alpha u - \sin(\alpha u))/\alpha^3] + B[2(\alpha v+1)(1-\cos(\alpha u))/\alpha^2)] + C[v\sin(\alpha u)/\alpha - (\alpha u - \sin(\alpha u))/\alpha^2)] + Du + E + F(v) + F1(u,v)u^4 + F2(v)u^3 v + F3(v)u^2 v^2 + F4(v)uv^3,$$

where

F(v), F1(u,v), F2(v), F3(v) and F4(v)

are any functions over the area of the lenses for which derivatives up to at least third order are continuous.

Translation only designs:

In this case $\alpha=0$. Applicant defines x=u, and y=v. He defines the origin x=0, y=0 to be the point directly in front of the pupil when looking straight ahead. The equations in this form are:

$$(\partial^3 t/\partial x^3)|_{(x,y)=(0,0)}=2A$$

$$(\partial^3 t/\partial x\partial y^2)|_{(x,y)=(0,0)}=2A$$

$$(\partial^3 t/\partial x^2\partial y)|_{(x,y)=(0,0)}=0.$$

Note that the Alvarez description is essentially the same at the center (x,y)=(0,0), but is too restrictive away from the center point. Applicant picks A for one lens to be the complement of the other lens.

The solution in found by taking the limit as a $\alpha\rightarrow 0$ in the above thickness expression, which results in $$t=A(xy^2+\tfrac{1}{3}x^3)+Bx^2+Cxy+Dx+E+F(y)+F1(x,y)x^4+F2(y)x^3y+F3(y)x^2y^2+F4(y)xy^3.$$

This can be seen as identical to the Alvarez except for the addition of F1, F2, F3 and F4. These additional functions will be shown in this patent to be important for optimized performance.

Designs including rotation:

The motion we consider may also include rotation in the x-y plane. In this case at least one of the lenses pivots about a pivot location. For a good solution to exist, this must be outside of the lens perimeter.

For the pivot design, we will call $r_0\theta=u$, and $r-r_0=v$, with $r_0=1/\alpha$. The origin r=0 is the pivot point, and $r=r_0$, $\theta=0$ is the point directly in front of the pupil when looking straight ahead. In this form, the equations are given by $$r_0^{-1}(r^{-2}\partial^3 t/\partial\theta^3+r^{-1}\partial^2 t/\partial r\partial\theta)|_{(r,\theta)=(r0,0)}=2A$$

$$r_0^{-1}(\partial^3 t/\partial r^2\partial\theta)|_{(r,\theta)=(ro,0)}=2A$$

$$r_0^{-1}(r^{-1}\partial^3 t/\partial r\partial\theta^2-r^{-2}\partial^2 t/\partial\theta^2)|_{(r,\theta)=(ro,0)}=0.$$

The solution in this form is $$t=Ar_0[(r^2+r_0^2)\theta-2rr_0\sin(\theta)]+B2r_0r(1-\cos(\theta))+Cr_0[r\sin(\theta)-r_0\theta]+Dr_0\theta+E+F(r)+F1(r,\theta)r_0^4\theta^4+F2(r)r_0^3(r-r_0)\theta^3+F3(r)r_0^2(r-r_0)^2\theta^2+F4(r)r_0(r-r_0)^3\theta,$$

The terms have been defined so that the constants are the same as in the general equation, but a shorter equivalent form is possible by redefining the constants:

$$t=A'r^2\theta+B'r\cos(\theta)+C'r\sin(\theta)+D'\theta+E'+F'(r)++F1'(r,\theta)\theta^4+F2'(r)(r-r_0)\theta^3+F3'(r)(r-r_0)^2\theta^2+F4'(r)(r-r_0)^3\theta.$$

Choosing Parameters

The choice of parameters to the general solutions depends on desired optical performance, other restrictions such as minimum and maximum thickness and aesthetic and other considerations. These specific optimum solutions use a form much more general than that described by Alvarez. Applicant picks the parameters and functions to optimize lens properties. In preferred embodiments 17 specific parameters and functions are optimized to provide desired performance and other quality and aesthetic results. These parameters are picked based factors that may include:

The variable optical power is adequate:

1. The on-axis optical power at the various settings (translation distances) should meet the design constraints.
2. The off-axis optical power at the various settings may be allowed to deviate within certain limits. The amount of deviation will typically be allowed to increase as the direction becomes more off-axis.

The optical performance at all power settings is adequate. This corresponds to the level of residual aberration at best focus:

3. The performance should be particularly good on-axis.
4. The off-axis performance may be allowed to degrade within certain limits. The amount of degradation will typically be allowed to increase as the direction becomes more off-axis.
5. The motion for a given optical power should be minimized. This is equivalent to maximizing the magnitude of the A parameter.
6. There will be a minimum lens thickness required for manufacturability and safety.
7. The total weight of the lens should be minimized.
8. The shape of the front surface most away from the eye meets certain aesthetic constraints such as a general convex shape.
9. The lenses are adequately separated so as not to bump.
10. The lenses are not allowed to separate so much as to make the assembly significantly less aesthetic.
11. The inner surface closest to the eye is adequately separated from the eye. The outer surface may also be constrained to be within a certain distance of the eye for aesthetic reasons.
12. The "average" wedge, which causes a lateral shift in the image location and possibly chromatic aberration, may be constrained to be within a certain limit.
13. The variable wedge, which causes a lateral shift in the image location as the power is adjusted, may be constrained to be within a certain limit
14. The wedge, both static and variable, may be matched for the lens pairs in front of each eye.

15. The design should be reasonably insensitive to the exact eye location relative to the lens within certain limits. This is to accommodate different face shapes.
16. The design may contain a prescription base correction. This base correction should be preserved as the lenses are translated into their power settings.
17. There may be a surface that is manufactured to a stock shape, with other surfaces allowed to be designed differently for various designs. This is in order to reduce manufacturing costs.

The thickness of the lens element in the above discussion is considered to be the difference in the front surface and rear surface lens z-location defined as a function of x,y (or u,v or r,θ). Due to bowing or tilting of the lens, there will be a slight difference between this thickness and thickness alternatively defined as minimum surface separation. It is more conventional in manufacturing to use the z-location definition. While it is important to have the definition clear for manufacturing, the effect on the constraints is usually very minor. This is because specifically for eyeglasses, the lenses are close enough to planar so that minimum thickness is close for the two definitions. The same discussion above also applies to gaps, which can be thought of as airspace thickness.

In addition to thickness, which is the difference between the surfaces, the lens design also requires the average of the two surfaces to be specified, which can be called the shape. Applicant places no restrictions on the functional form of the shape, other than the above constraints, and limits to the degree of approximation (for computational purposes). In preferred embodiments actually tested with optical software the constraints were applied with results that are discussed later.

Balancing Design Constraints

All of these design constraints cannot simultaneously be individually optimized; instead, some balance needs to be chosen by the designer. This can be accomplished algorithmically by combining constraints, for parameters which must be met; and a merit function to be minimized, which contains a functional combination of parameters and creates an optimal balance based on the weighting of the parameters in the merit function.

Adequate Optical Performance

Adequate optical performance is both a design and a manufacturing consideration. For the case of design, most common is to use the well-known technique of ray tracing to evaluate performance. Other techniques include wave optics simulations.

Adequate optical design performance divides into categories:

1. Optical power at the various settings, on-axis: usually selected by the designer. This is the amount of focus, usually expressed in diopters, of the rays entering the eye's pupil.
2. Optical power off-axis: this value should match the on-axis power setting to a degree, but may be allowed to deviate in order to optimize other lens parameters
3. Residual best-focus aberration, no prescription: minimized. This is the residual ray angular deviation which remains after focus is removed. The residual aberration will usually be most constrained on-axis, and allowed to increase as the eye is pointed increasingly off-axis. This can be expressed in terms of peak aberration, or in terms of some weighted sum such as rms aberration.
4. The residual best-focus aberration may be designed for a prescription correction. In this case the residual will be residual ray angular deviation which remains after focus and prescription are removed. Usually the prescription correction includes focus and 2 directions of astigmatism, but may include higher order terms.

Preferred Technique for Optimization

Applicant presents here a preferred technique for optimizing the lens units. It should be noted that the numerical techniques involved are standard, and can be implemented in various ways. Elements of the present invention include the application of the desired constraints and merit functions to the mathematics of lens design, and the more general variable thickness profile formulas which allow superior optimization.

Figure 1B:
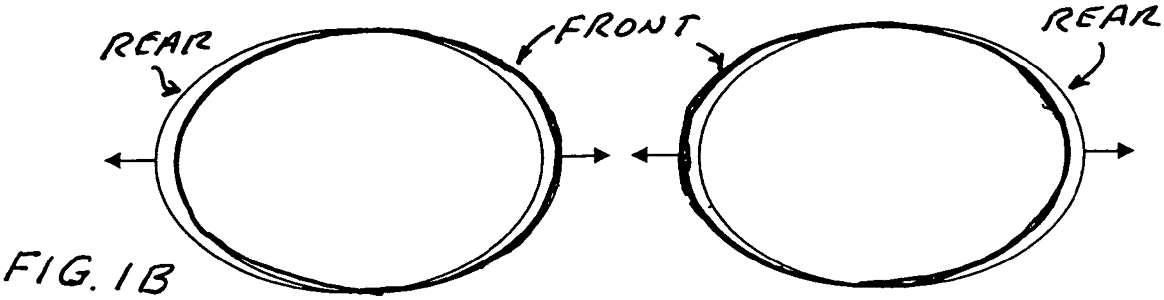
Figure 1D:
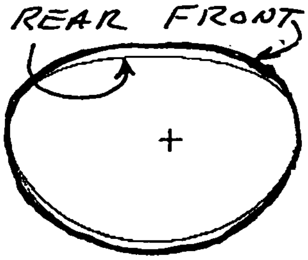
FIG. 1D shows the general shape of preferred lens elements and an "eye center".

As an example for a preferred embodiment, Applicant takes the following parameters:

1. first lens height H1=36 mm,
2. second lens height H2=32 mm,
3. lens width W=50 mm,
4. lens perimeters shown in FIG. 1D,
5. eye center offset y=3 mm from lens center, plotted with a cross in the FIG. 1D,
6. lenses translated in the height direction,
7. minimum thickness 1 mm for each lens,
8. index of refraction n=1.5,
9. motion of lenses +−1 mm complementary motion,
10. lens motion centered around an axis 150 mm behind lenses, causing a slight rotation in the x-z plane in addition to the translation,
11. 1 diopter base power for the system,
12. variable power +−1 diopter for the system,
13. total power 0 to 2 diopters,
14. center of lenses 35 mm from the eye center of rotation,
15. pupil diameter 4 mm,
16. total wedge less than 0.04,
17. 5 front surface locations defined for aesthetic reasons to control the general curvature,
18. minimum lens separation 0.25 mm,
19. maximum lens separation 1.75 mm,
20. thickness restricted to x,y thickness equations defined above, with terms up to $5^{th}$ order, and
21. shape allowed to be any $5^{th}$ order polynomial meeting the above constraints.

Given the above constraints, Applicant investigated balance between the residual aberration at various angles and the total weight, expressed as average thickness. He wanted to achieve:

1. average thickness <2 mm, or best possible,
2. single-wavelength ray aberration diameter <1 mrad at all 0.5 radian off-axis look angles, which corresponds to approximately ½ diopter of astigmatism, or best possible, and
3. single-wavelength ray aberration diameter <⅓ mrad at all 0.25 radian off-axis look angles, which corresponds to approximately ⅙ diopter of astigmatism, or best possible.

Applicant found it desirable to use a ray trace algorithm to evaluate the residual aberration. The residual aberration was computed as the angular error remaining in rays throughout the pupil area, after the best focus term is found and removed. He picked surfaces defined by polynomials up to $5^{th}$ order, but constrained by the basic thickness equation and the above constraints.

Lens thickness was evaluated at 211 points distributed throughout the lens to make sure that the minimum thickness was greater than 1 mm. These points were densest on the actual perimeter, because most of the minima are found on the perimeter. Gap thickness was evaluated at 61 points for each of the 2 extreme translation positions. It should be noted that there are other numerical and analytic techniques to find the minimum and maximum thickness locations. Any of those techniques can be used to find minima, which are then used in the later optimization to provide constraints on the optimization. Applicant has implemented those techniques, which also work, but seem to be numerically slower.

Applicant found it also desirable to evaluate the aberrations at 16 positions placed in a circle for each of the two off-axis-angles (a total of 32 directions), and for each of the two extreme lens positions. As explained above he picked surfaces defined by polynomials up to $5^{th}$ order, but constrained by the basic thickness equation and the above constraints. It is possible to use even higher order polynomials, and achieve better results; however, this requires more sampling of look angles and thickness locations, and therefore increases computational burden.

These calculations were carried out using MathCAD, with its built-in minimization routines. The MathCAD algorithms Applicant used are all standard and well-known.

Chromatic aberration depends mostly on the power and wedge, so was not included in this optimization. The chromatic aberration has been included in other designs we have performed using the commercial optics design program Zemax. The Zemax optimizations will be discussed later.

Nominal Optimized Design:

This design used the general thickness equations described above. Polynomial terms up to $5^{th}$ order were considered for the thickness profiles. Applicant achieved:

1. average thickness 2 mm,
2. single-wavelength ray aberration diameter <0.84 mrad at all 0.5 radian off-axis look angles, and
3. single-wavelength ray aberration diameter <0.28 mrad at all 0.25 radian off-axis look angles.

The general shape of preferred lens elements are typical shapes as shown in FIG. 1D.

Figure 2A:
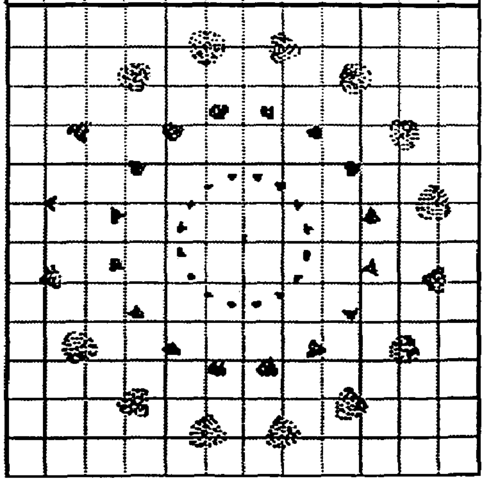
FIGS. 2A, 2B and 2C and 3A, 3B and 3C show results achieved with the present invention.
Figure 2B:
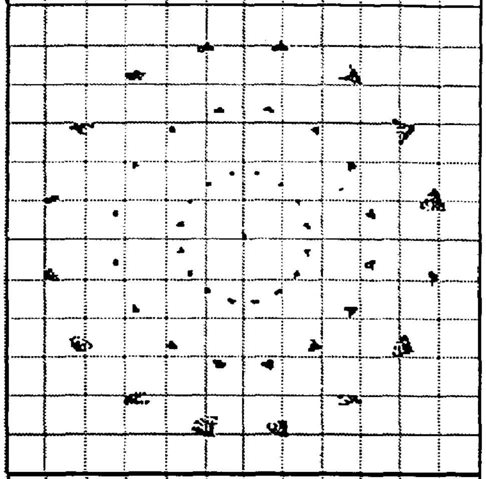
Figure 2C:
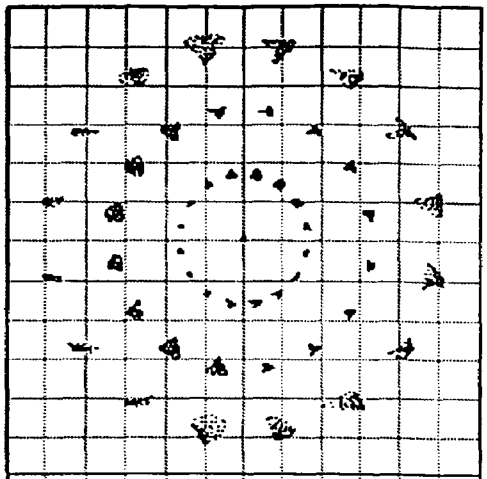

The aberration diagrams are shown in FIGS. 2A, 2B, and 2C for the 0 diopter, 1 diopter, and 2 diopter positions, respectively. The outer ring of spots corresponds to 16 positions each 0.5 radian off-axis, and the next ring corresponds to 16 positions each 0.333 radian off-axis, the inner ring is 0.166 radian off-axis, and the center spot is on-axis. These spots have been placed artificially close together for viewing purposes. The spot sizes are plotted accurately on the scale where the grid spacing equals 1 mrad.

Figure 3A:
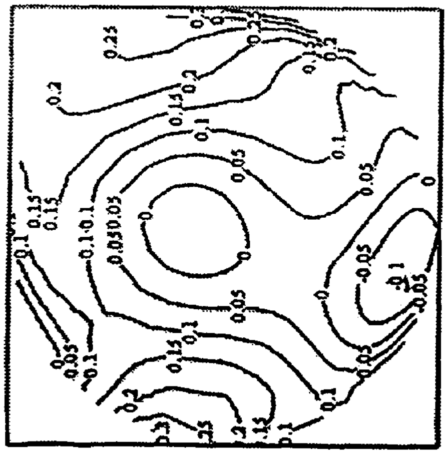
Figure 3B:
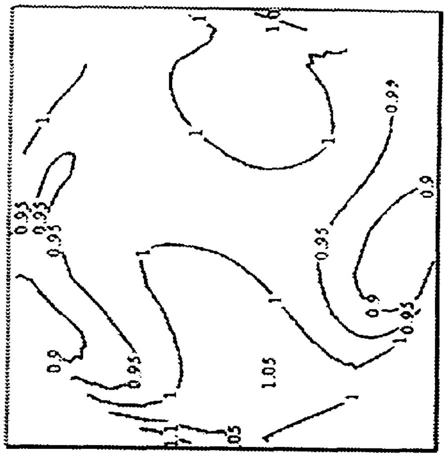
Figure 3C:
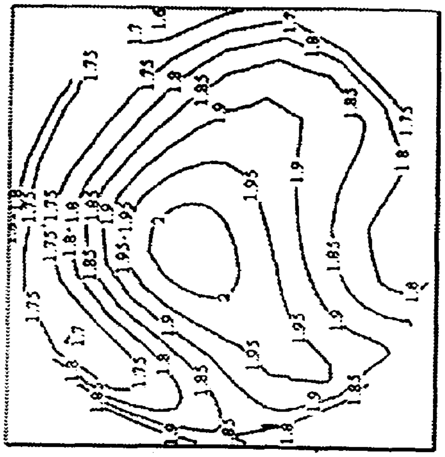

The power diagrams are shown in FIGS. 3A, 3B, and 3C for the 0 diopter, 1 diopter, and 2 diopter positions, plotted over the 0.5 radian nominal field. The values are in diopters.

Achieving the proper on-axis power is important, and is constrained by fixing the A parameter; but a small deviation when looking off-axis is not as important (as the eye usually is able to correct small focus errors), and was not constrained in this case.

Optimization with a Prescription Function:

A design with prescription correction can be optimized using the same procedure described above. The only difference is subtraction of the ray directions associated with the desired base prescription before finding the best focus residual aberration.

Optimization with a Pivot Design:

A pivot design is optimized using the same procedure described above for translating lenses. The only difference is 1) the lens thickness parameters use the formula described above for the pivot design, and 2) the ray trace calculations and spacing calculations are performed on the lenses with the pivot motion rather than translation motion.

Comparison with Prior Art Designs:

Applicant prepared a prior art design for comparison purposes. This design used the more restrictive thickness equations described in Alvarez, but with polynomial terms up to $5^{th}$ order considered for the common shape of the front and back surfaces. This allowed complex shapes but with the simpler Alvarez thickness formula. Applicant achieved:

1. average thickness 2.22 mm,
2. single-wavelength ray aberration diameter <1.20 mrad at all 0.5 radian off-axis look angles, and
3. single-wavelength ray aberration diameter <0.40 mrad at all 0.25 radian off-axis look angles.

Figures 4A, 4B, 4C:
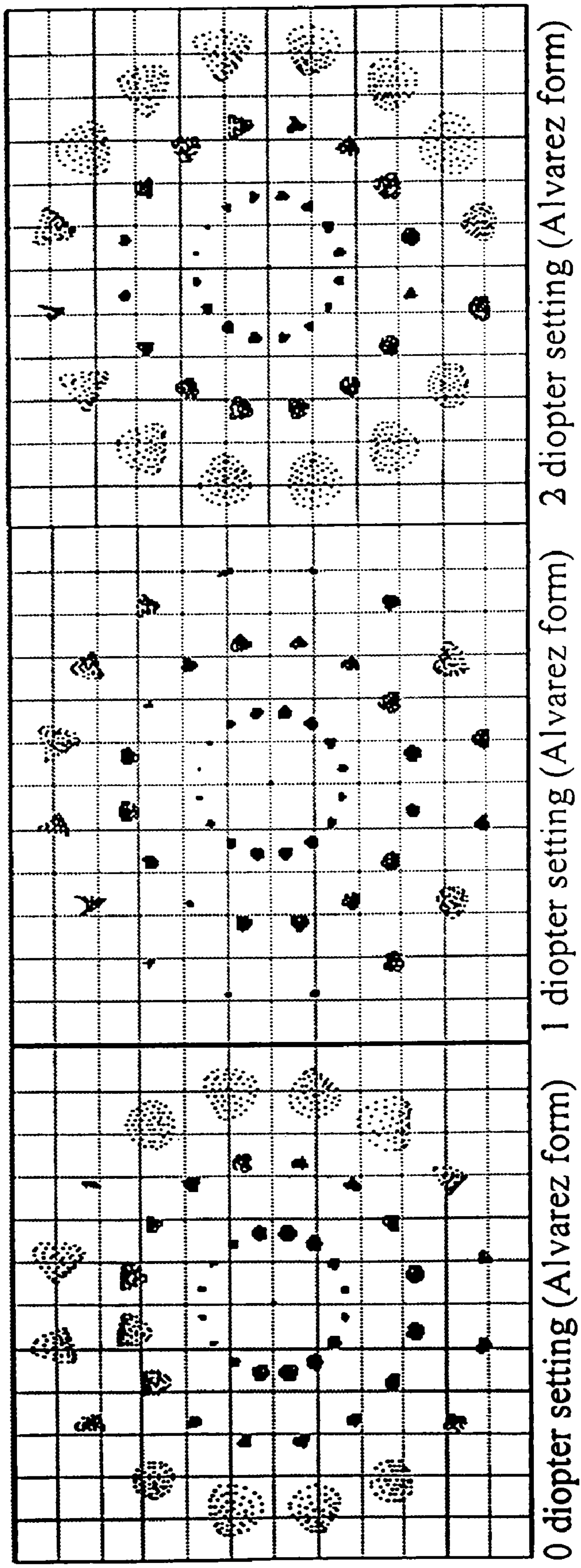
FIGS. 4A, 4B and 4C show comparison results achieved with a prior art technique.

The results are shown in FIGS. 4A, 4B, 4C. Despite being significantly thicker and therefore more massive, the design has worse optical performance due to the restrictions on the thickness.

Optimized Design Matching Prior Art Thickness

This design used the general thickness equations described in this patent. Polynomial terms up to $5^{th}$ order were considered for the surfaces. The merit function was adjusted so that the average thickness matched the prior art design. We achieved:

1. average thickness 2.22 mm,
2. single-wavelength ray aberration diameter <0.42 mrad at all 0.5 radian off-axis look angles, and
3. single-wavelength ray aberration diameter <0.14 mrad at all 0.25 radian off-axis look angles.

Optimized Design Matching Prior Art Aberration:

This design used the general thickness equations described in this patent. Polynomial terms up to $5^{th}$ order were considered for the surfaces. The merit function was adjusted so that the residual aberrations matched the prior art design. Applicant achieved:

1. average thickness 1.88 mm,
2. single-wavelength ray aberration diameter <1.20 mrad at all 0.5 radian off-axis look angles, and
3. single-wavelength ray aberration diameter <0.40 mrad at all 0.25 radian off-axis look angles.

Summary: Alvarez and Mukaiyama vs Present Invention

Alvarez

The performance comparison of a lens unit designed according to the present invention versus an Alvarez designed lens unit is summarized in the following table:

| | Average Thickness | Aberration (At 0.5 Radians) | Aberration (At 0.25 Radians) |
|---|---|---|---|
| Prior Art (Alvarez) | 2.22 | 1.20 | 0.40 |
| Present Invention (Nominal) | 2.00 | 0.84 | 0.28 |
| Present Invention (Low Aberration) | 2.22 | 0.42 | 0.14 |
| Present Invention (Low Weight) | 1.88 | 1.20 | 0.40 |

It is clear that the equations described by Alvarez are significantly inferior to the equations described in this patent.

Mukaiyama

The Mukaiyama patent (1997) treats the two lenses as if they behave independently, with power and astigmatism effects essentially summing. Applicant found this assumption to be highly inaccurate. To show this, he first plotted the power diagrams for the back and front lens separately. See FIGS. 5A and 5B. Notice that the lines of constant power are not even close to linear, in contrast to a key requirement of the Mukaiyama patent.

Also, the Mukaiyama patent makes an implicit assumption that these values simply add together when the lenses are placed in tandem. Here he shows that assumption to be false. See FIGS. 6A and 6B. The first plot is the sum of the above two power diagrams, with contour lines separated by 0.05 diopters (the numbers were left off for visibility). The second plot is the actual power diagram for the system. Notice that the two diagrams do not agree, which shows that it is necessary to consider the lenses as a unit when performing the optimized design.

Zemax Optimization

ZEMAX optical design software was also used to perform the optimization of the shape of the polynomial surfaces after the thickness profiles had been calculated as described above. The optimization feature in ZEMAX uses an actively damped least squares method and a merit function that allows for constraints on most optical and physical properties of a lens. A root mean square (RMS) spot radius 'Default Merit Function' was used with the additional constraint on the minimum lens thickness of 1.0 mm. Due to the non-rotationally symmetric nature of these lenses, multiple operands were required to constrain the lens thickness at several radial zones within the lens. The nominal polynomial function that provides a desired change in optical focusing power with lateral translation tends to have thickness minima in the outer half of the lens, so the constraint on the minimum thickness was defined at zones of 60%, 70%, 80%, 90% and 100% of the lens diameter.

A total of 27 configurations were created in a ZEMAX file to model the lens at 9 different eye gaze angles for 3 different lens translational positions (0D, +1D, +2D). The merit function was weighted over these 27 positions such that the performance was appropriately better at the central gaze angles. Specifically, the on-axis gaze angle was weighted at 20, the next 4 closest gaze angles were weighted at 2 and the 4 peripheral gaze angles were weighted at 1.

The thickness of the polynomial surface is defined by a $5^{th}$ order polynomial function in x and y. The form of the polynomial function is:

$$T(x,y)=a_1x+a_2x^3+a_3xy^2+a_4y^4+a_5x^2y^2+a_6y^4+a_7x^5+a_8x^3y^2+a_9xy^4.$$

In addition to slight eye focus for the off-axis gaze angles, the following polynomial coefficients were free to vary during optimization:

$$a_1, a_2, a_3, a_4, a_5, a_6, a_7, a_8, a_9.$$

The ratio of $a_2$ to $a_3$ was fixed to match the functional form defined above for the thickness. Only even-powered y terms-were used because for this particular case the lens and view angles were taken to be symmetric in y. This simplified the problem by introducing symmetry. The second order terms were omitted, because the lens surface radii of curvature were selected as an alternative to use of $x^2$ and $y^2$ terms.

Figure 17:
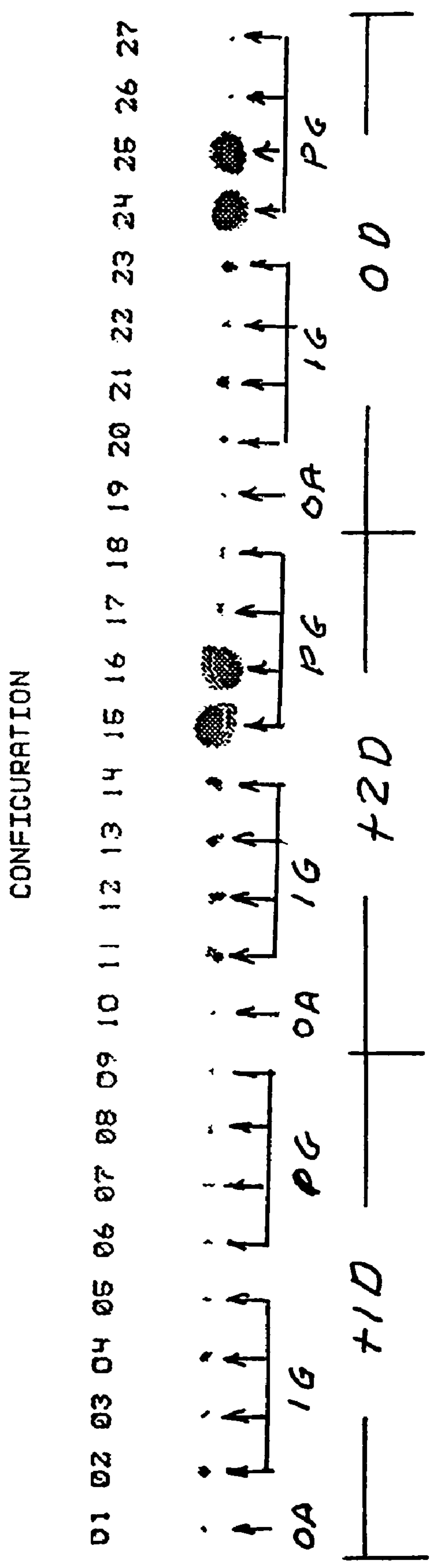
FIG. 17 show results of a ZEMAX optimization.

FIG. 17 is the resulting spot diagrams for the 27 configurations. The configurations correspond to the following lens positions and gaze angles:

Configurations 01-09=+1D

Configurations 10-18=+2D

Configurations 19-27=0D

On-Axis (OA) Gaze Angles=Configurations 1, 10, 19

Intermediate Gaze (IG) Angles=Configurations 2-5, 11-14, 20-23

Peripheral Gaze (PG) Angles=Configurations 6-9, 15-11, 24-27

Frame Designs

First Frame Design

A first proposed version of a frame design that permits lateral relative motion of the lens elements in each lens unit is shown in FIG. 7A. This is a drawing of a pair of eyeglasses with wearer operated focusing lenses. A more detailed version of one of the lens units is shown in FIG. 7B. This embodiment includes metal or plastic frame 2, two back lenses 4 and two front lenses 6. Back lenses 4 are mounted rigidly on frame 2. Front lenses 6 are mounted so that they can be moved laterally with respect to back lenses 4. Two pen mounts 8 are attached rigidly to frame 2 and tabs 10, 12 and 14 are attached rigidly to front lenses 6. Pen 16 passes through pen mounts 8, allowing it to slide through tab 10. Pen 18 passes through frame 2, allowing it to slide through tab 12. Adjustment screw 20 passes through frame 2 and screws into treaded socket 15 in tab 14. Spring 22 between frame 2 and tab 12 provides a compressive force in the direction of adjustment screw 20. The wearer of the glasses shown in FIG. 7A adjusts the focus of each of the lenses by rotating adjustment screws 20 as shown in FIG. 7B.

Techniques for Use

This simple preferred embodiment of the present invention provides important improvements over prior art glasses such as bifocals, trifocals and continuous focal lenses. The lens units can each be adjusted by the user so that his viewed object at any distance from a few inches to infinity is exactly in focus. This is especially advantageous if the viewed object is stationary with respect to the wearer such as when reading, working at the computer, watching TV and watching a movie. Many of the potential embodiments of the present inventions do not provide for very quick adjustment of the focus. This could be somewhat of a problem in situations, for example, when a student is watching a lecturer and taking notes at the same time. A simple solution in these situations, however, would be to provide for separate adjustment of the two lens units and for the wearer to adjust one lens units to focus on the lecturer and the other lens units to focus on his notes. His brain will then take over and in each case produce images using data from the in-focus eye.

Movement Directions

The lenses can be moved separately or as units. Either lens of a lens pair can be moved, but the preferred approach is to move both lenses in opposite directions to achieve maximum differential movement with a minimum of absolute movement. In addition, the lenses can be adjusted using actuation from both sides simultaneously, one particular side only, or either side. Designs which can be actuated from either side allow the most ergonomic operation, and such designs with this property are described below.

FIG. 1A shows lens movement in the vertical direction. In this case the front lens element can be moved as a unit, and the back lens element moved as a unit. Applicant discusses a variety of approaches to constrain the motion to the proper displacement.

FIG. 1B shows lens movement in the horizontal direction. In this case the front lens element can be moved as a unit, and the back lens element either fixed or moved as a unit; however, for this case it may be preferable to connect one front lens to the back lens on the other eye, and vice versa ("crossover"). The crossover movement keeps the motion more symmetrical between the two eyes.

Figure 1C:
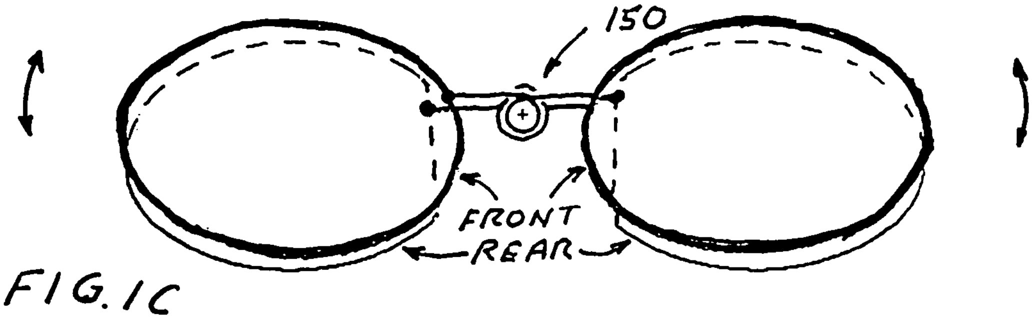

FIG. 1C shows pivot motion. In this case, as in the horizontal motion case, the front lens element can be moved as a unit, and the back lens element either fixed or moved as a unit; however, for this case it may be preferable to connect one front lens to the back lens on the other eye, and vice versa. The crossover pivot keeps the motion more symmetrical between the two eyes.

Vertical Movement to Adjust Focus

There are some significant advantages of using vertical adjustment of the two lens elements relative to each other to provide focus changes. The principles described above for horizontal adjustment apply equally well for the vertical adjustment, by interpreting x as the vertical direction and y as the horizontal direction.

Figure 8:
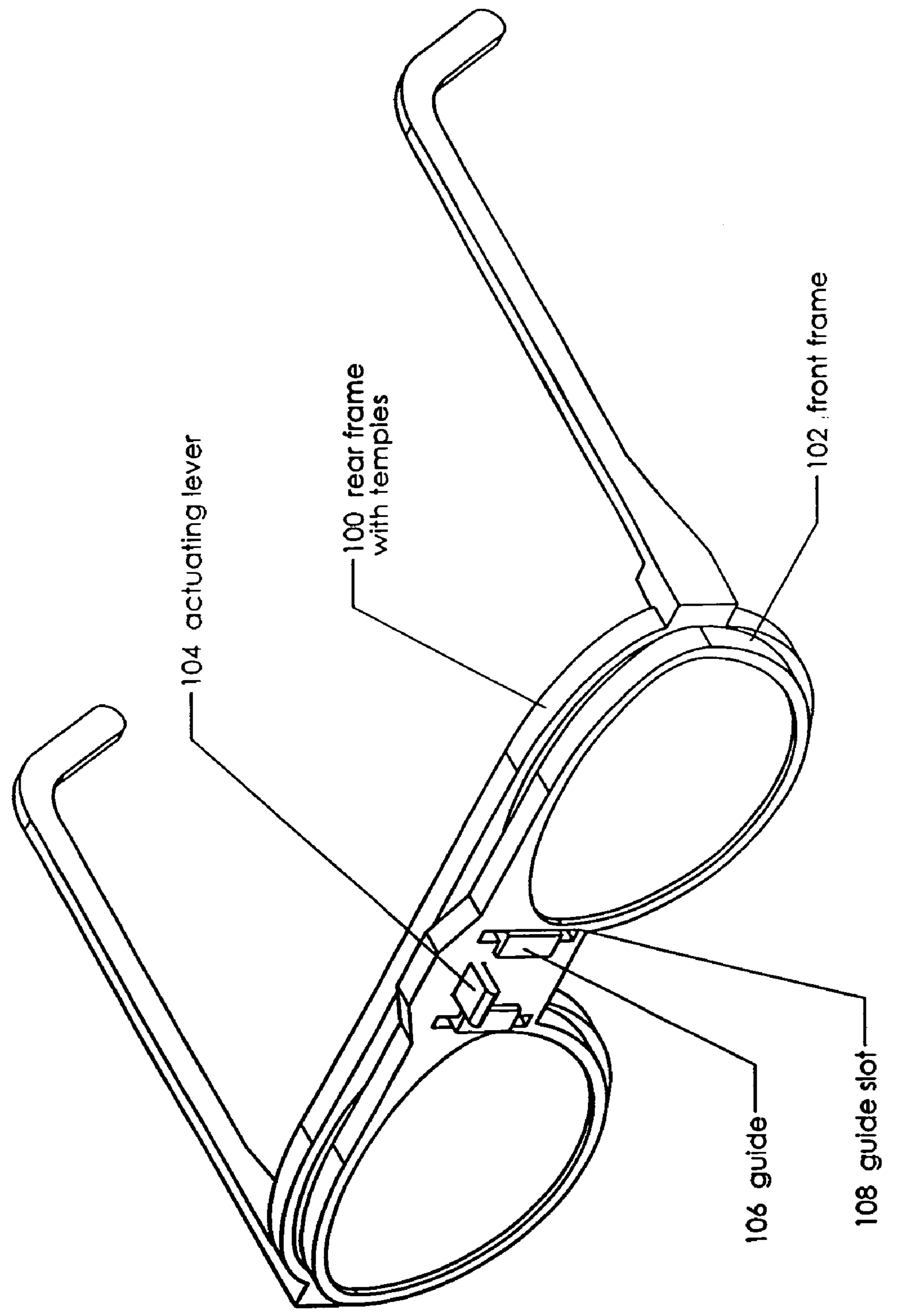
FIG. 8 shows a frame design for vertical relative lens motion.

A frame design for vertical relative motion is shown in FIG. 8. In this design, rear frame 100 is positioned on a wearer in the same manner as regular glasses. Front frame 102 is mounted on frame 100 with slide guide 106 and slide slot 108 so that front frame 102 is free to slide up and down relative to rear frame 100 but can not move sideways relative to rear frame 100. The wearer is able to position front frame 102 relative to rear frame 100 by pushing on actuating tab 104 in order to adjust the focus of the lenses. Close tolerances between guide 106 and guide slot 108 hold the front frame in position after it has been positioned by the wearer.

Figure 9A:
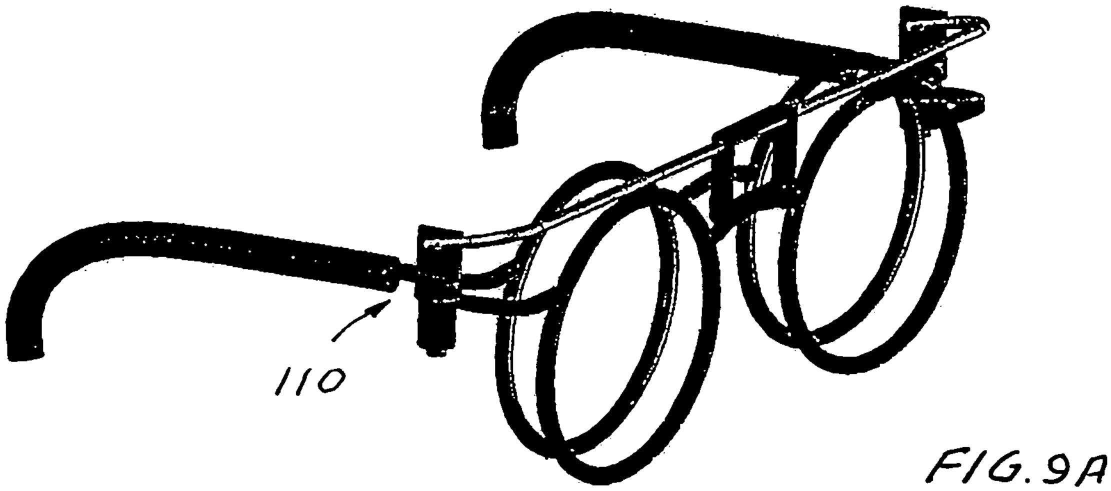
Figure 9B:
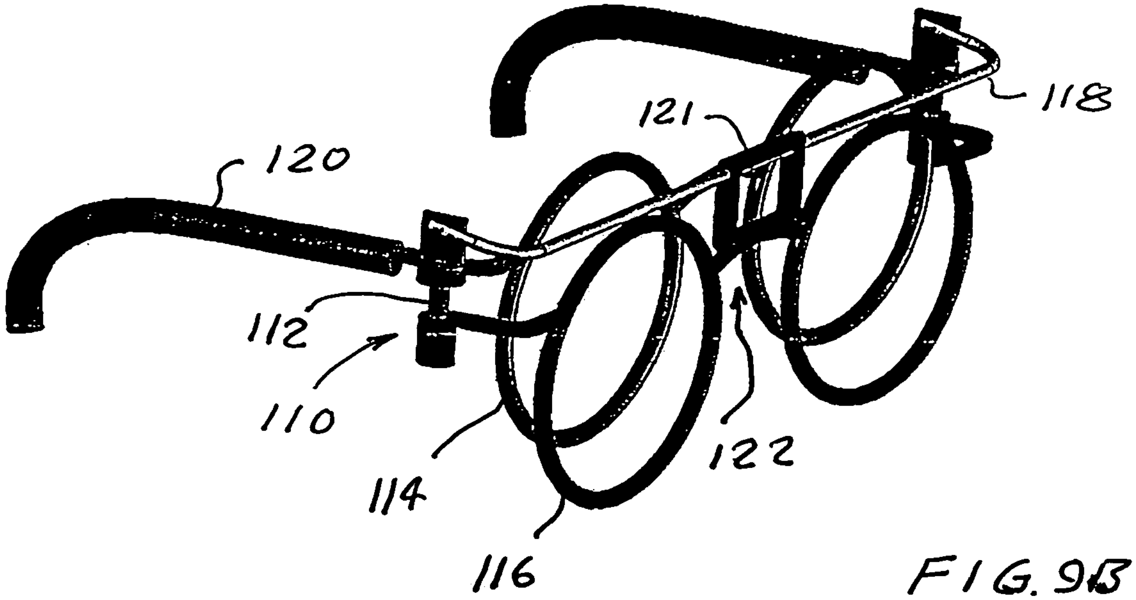
Figures 10A, 10B, 10C, 10D, 10E:
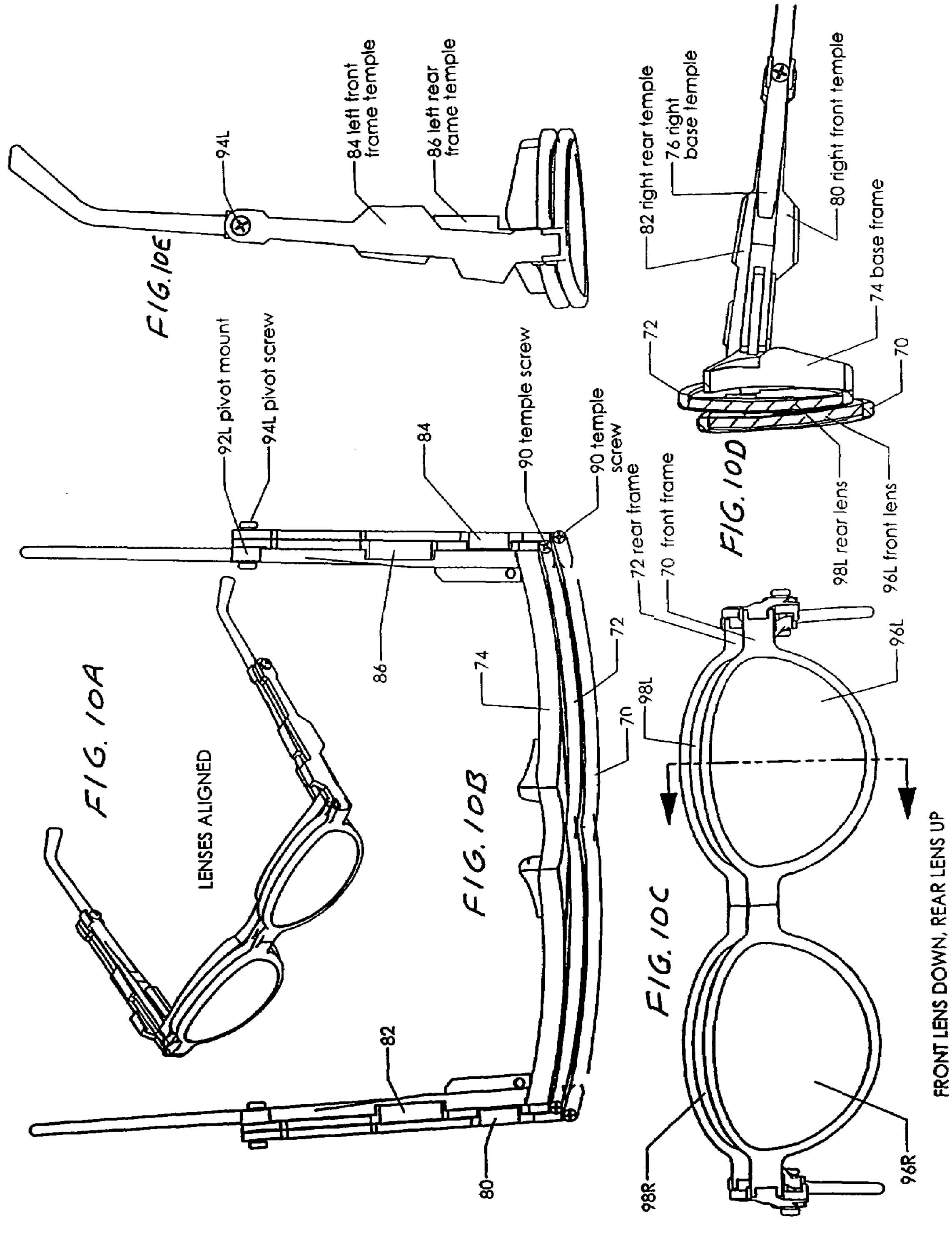
FIGS. 10A through 10E show features of a third frame design for vertical lens motion.
Figures 12A, 12B, 12C, 12D:
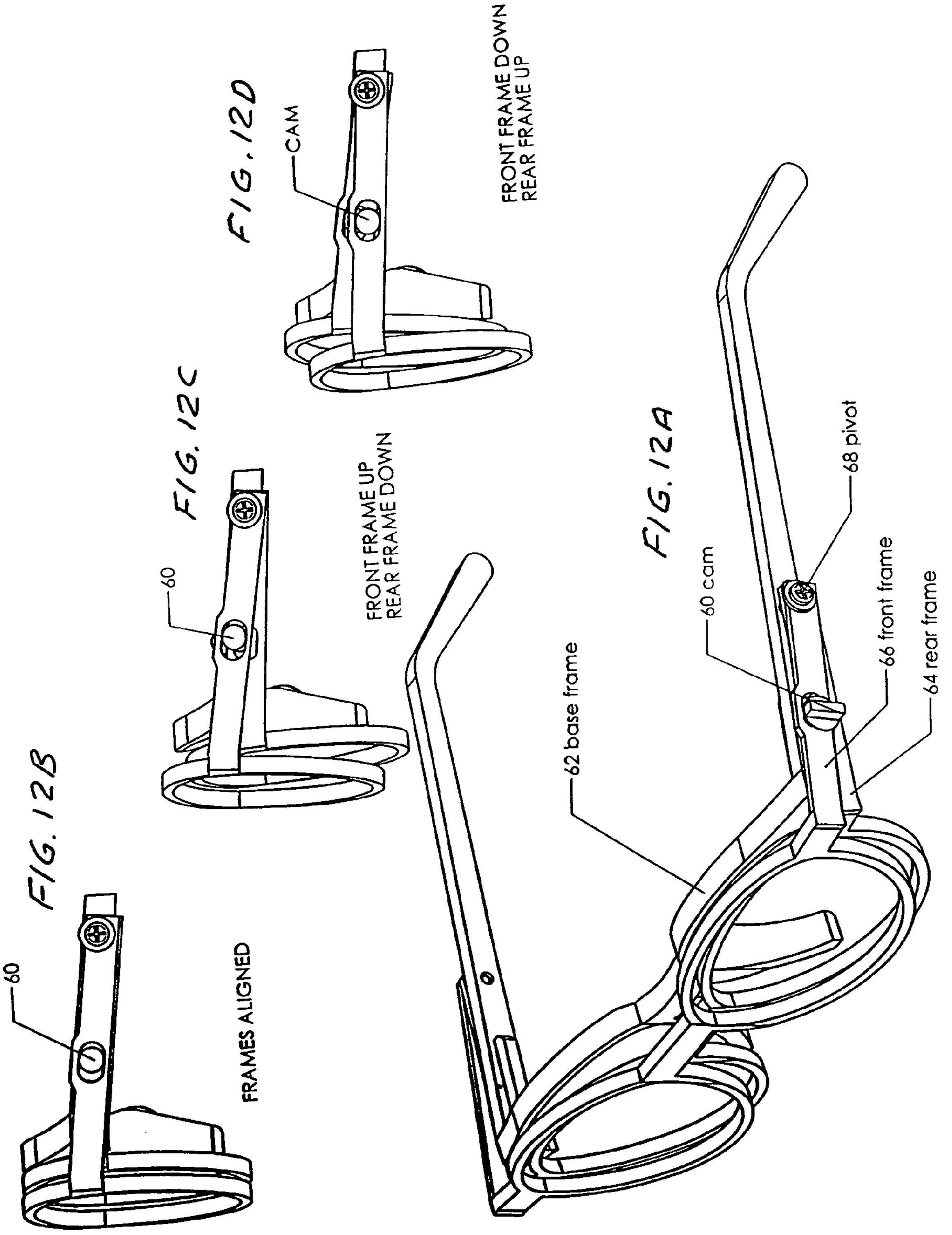
FIGS. 12A through 12D show features of a fifth frame design for vertical lens motion.
Figure 14D:
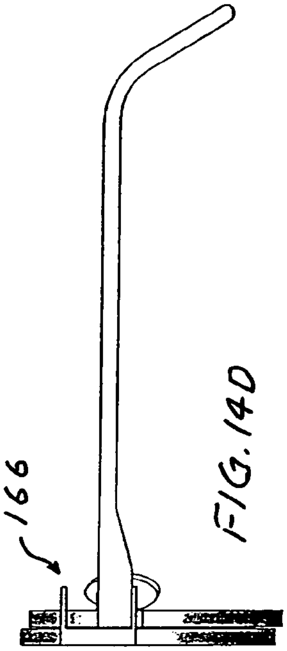
FIGS. 14A through 14G show features of a second frame design for pivotal lens motion.
Figure 14E:
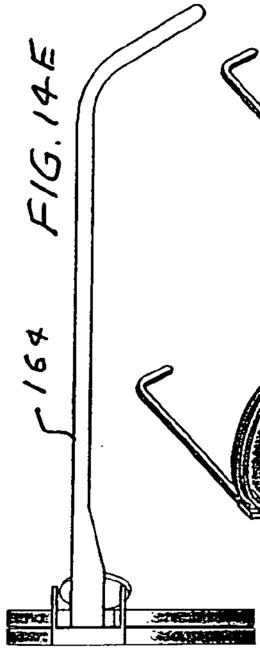
Figure 14G:
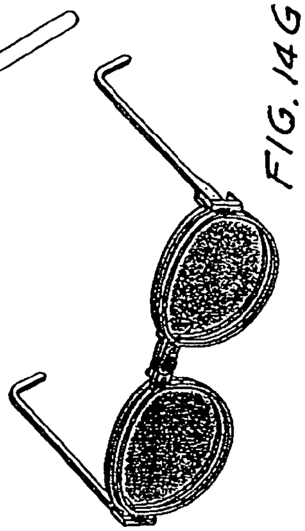
Figure 14F:
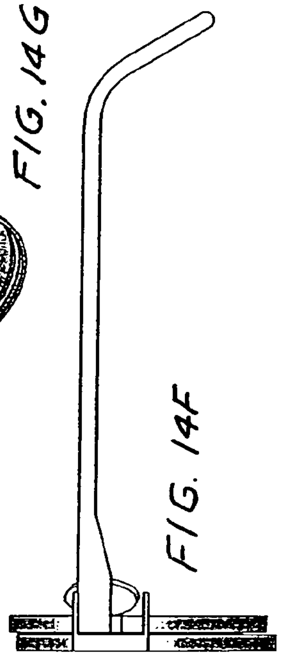
Figure 14A:
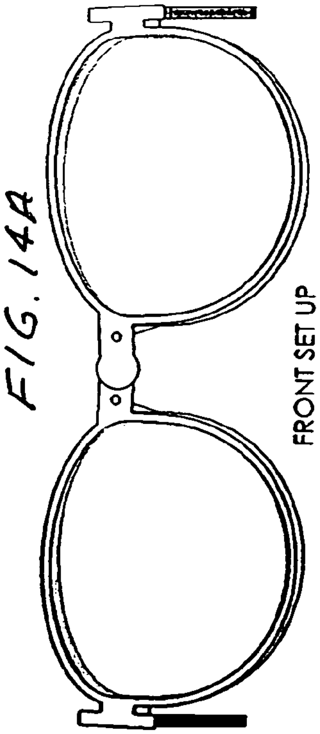
Figure 14B:
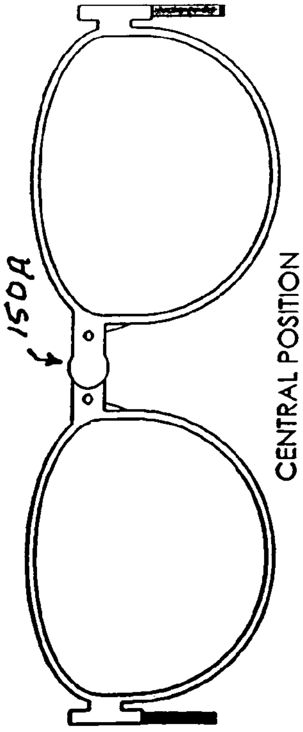
Figure 14C:
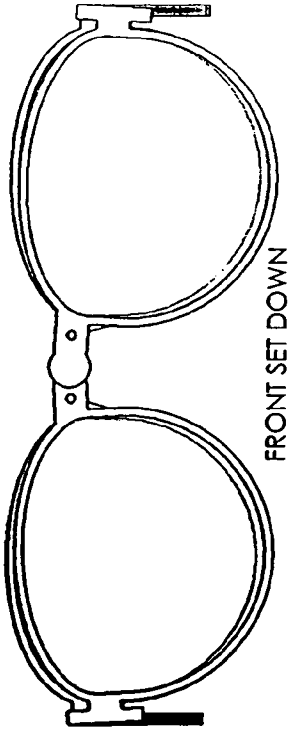

FIGS. 9A and 9B show another frame design for adjusting the front frame up and down relatively to the rear frame. In this case slide ring 110 that is a part of front frame 116 slides up and down on shaft 112 that is a part of rear frame 114. The wearer adjusts the relative positions of the two frames by adjusting pivot bar 118. The earpieces 120 are a part of rear frame 114 and the nose rest 122 is a part of front frame 115. Front frame 115 hangs from pivot bar 118 via hang element 121 that pivots about pivot bar 118 and a pivot connection at nose rest 122 so that the displacement of frame 116, produced by the pivoting of pivot bar 118, does not alter the spacing between the two frames.

FIGS. 9C through 9I show features of a frame design similar to the one described-above. This frame includes back lens assembly 124, front lens assembly 126, a torsion bar assembly 128, two adjusting side bars 130 and a nose piece assembly 132 and ear piece 134. The torsion bar assembly includes torsion bar 128A two sleeves 128B (through which bar 128A is free to pivot) that are rigidly attached to back lens assembly at locations 128C. Bar 128A is pivotably attached to front lens frame assembly 126 at locations 128D. The two adjusting side bars 130 are pivotably attached to ear piece 134 at location 134A and are attached to front lens assembly at location 134B as shown in FIG. 9G. Back lens assembly 124 includes peg attachment 124A which is comprised of two curved pegs as shown in FIG. 9H. Front lens assembly 126 includes two sleeve attachments 126A each attachment having two sleeves that slide in a general up and down direction on the pegs of peg attachment 124A. Preferably the curve of the pegs matches the nominal radius of curvature of the lenses. This frame also includes nose piece assembly 136 on which both front and back lens assemblies rest via sleeves 124B and 126B and stops 136A. With this feature the eyeglasses are positioned based on the location of the lowest of the two lens assemblies. Therefore, the movement of the center of the lens units relative to the wearer's eyes moves only half as far as in the FIG. 8 example. Front lens assembly 126 is raised relative to back lens assembly 124 by squeezing bar 130 and earpiece 134 at location 134A and lowered by squeezing at 134B as shown in FIG. 9G. Torsion bar 128 is preferably stiff enough to assure that the relative motion of the lens elements in both lens units is approximately the same. The movement up or down of the front lens elements in one of the lens units relative to the rear lens element induces a torque on torsion bar 128A which produces a corresponding movement in the front lens element in the other lens unit.

FIGS. 10A through 10E show features of a prototype frame design. In this version support frame 74 fits on the wearers head just as regular glasses. The lenses, both rear lenses 98R and 98L and front lenses 96R and 96L are contained in separate frames, rear frame 72 and front frame 70, that move relative to support frame 74. Frames 70 and 72 pivot about left and right pivot mounts (left mount 92L and pivot screw 94L are shown). FIG. 11B shows the two lenses aligned. The wearer raises front lenses 96L and 96R in front frame-70 and lowers rear lenses 98L and 98R in rear frame 72 to positions such as the one shown in FIG. 11A by squeezing frame temple arms at position 87 as shown in FIG. 11B. The wearer moves the lenses in the opposite directions by squeezing frame temple arms at position 85 as shown in FIG. 11B. The result is shown in FIG. 11C.

FIGS. 12A through 12D shows a variation of the FIGS. 10A-E version. The FIGS. 12A-D version is the same as the FIGS. 10A-E version except the wearer adjusts the relative positions of the lenses by turning cam 60 instead of squeezing the temple arms.

Direction of Lens Movement

Preferably the relative motion of the two lens elements in a lens unit is in directions related to the nominal curvature of the lens unit. For example if the nominal curvature of the lens unit is 150 mm; their relative motion preferably could be along a radius approximately 150 mm behind the center of the lens unit. However, optical analysis performed by Applicants has shown that tolerances on this issue is loose and (for the 150 mm nominal curvature example) the lens unit performs acceptably if the radius is within the range of about 50 mm to infinity (parallel motion). For embodiments where the nominal curvature of the lenses is flat, relative motion should be parallel. In the examples shown in FIGS. 10A through 10E the relative motion of the two lenses is defined by radii of about 50 mm. In the FIG. 8 example a curvature such as 150 mm could be designed into guide 106 and guide slot 108. In the 9A and 9B example the shaft 112 and sleeves 110 could be designed for a curvature of 150 or any other desired curvature.

Horizontal Movement to Adjust Focus

Figure 16A:
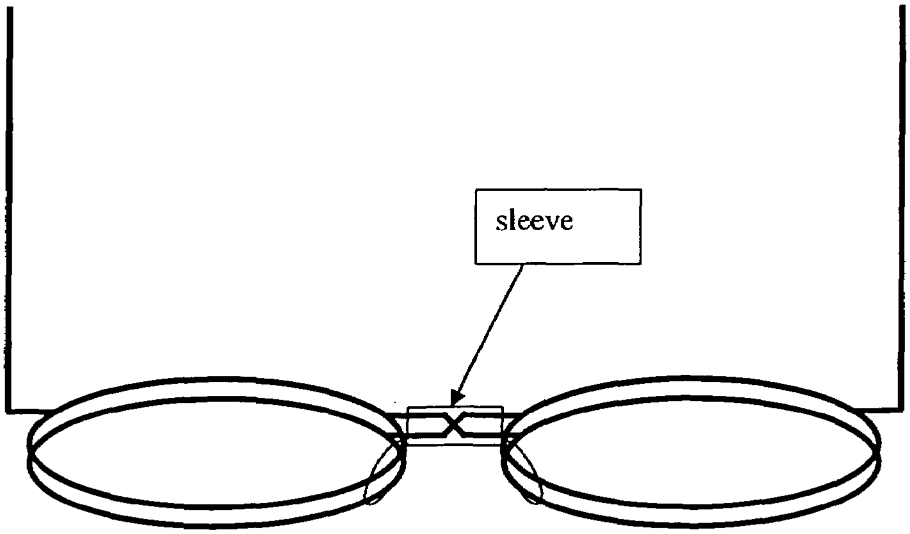
FIGS. 16A and 16B show a frame system for side to side adjustment.
Figure 16B:
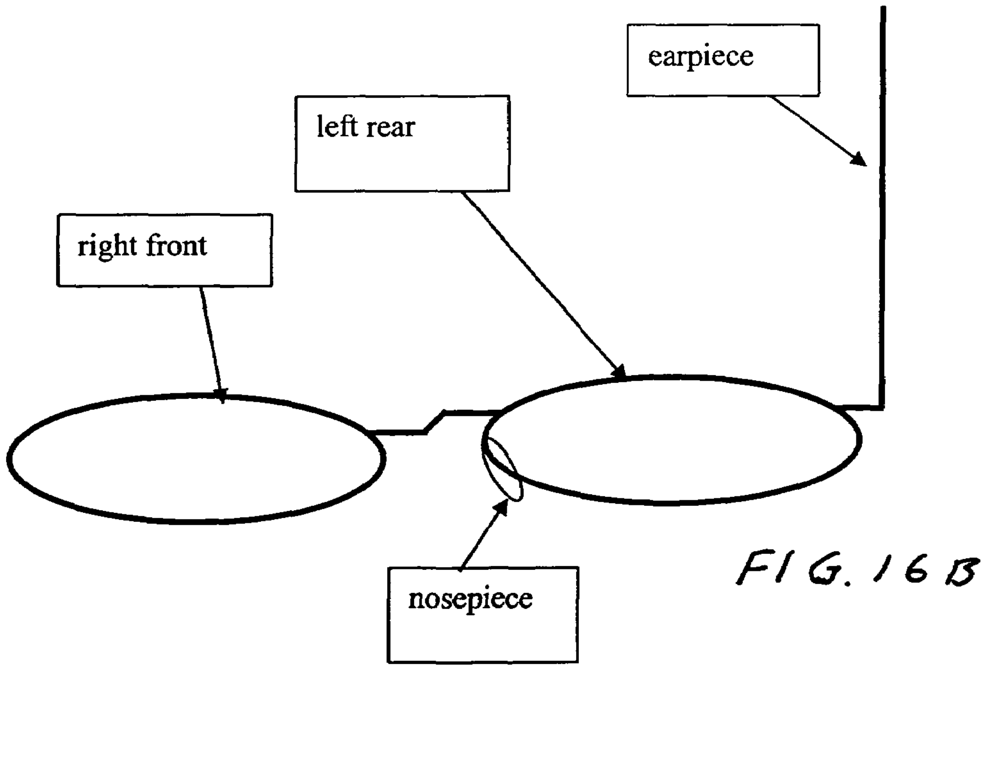

An example of horizontal motion frames is shown in FIGS. 16A and 16B. In one of the units, the left rear lens is attached to the right front lens, an earpiece, and a nosepiece. An identical but mirror-image unit is attached to this unit via a sleeve, allowing horizontal motion.

Pivot Adjustments of Focus

Eyeglasses made with lens pairs that are differentially rotated around a pivot point outside of the lenses. The rotation is in a rotation plane approximately perpendicular to the axes of the lenses and about a pivot point in the rotation plane. In embodiments of the present invention the surface design of the lenses is much more complicated than in the Alvarez type embodiments and the designs described in the parent applications referred to in the opening sentence of this specification, but the mechanism to move the lenses to achieve desired focusing power turns out to be simpler and more precise as compared to the linear movements. The pivot point is preferably equidistant from the two eyes. This preferred rotation point can be the midpoint between the two eyes, or any point above or below the midpoint.

Angular Adjustment with Crossover Pivot Mechanism

FIGS. 13A-13G are drawings showing features of a preferred embodiment providing angular adjustment of the lenses of a set of eyeglasses using a crossover pivot configuration. In this configuration the lenses pivot about a pivot mechanism 150 identified in FIGS. 13B and 13G. Nose pieces 152 are attached rigidly to pivot axle 154 in pivot mechanism 150. All four lenses pivot about pivot mechanism 150. Right front lens 156 is rigidly attached to left rear lens 158 and left front lens 160 is rigidly attached to right rear lens 162 so the lenses move in a scissors-like manner about pivot mechanism 150. The pivot mechanism 150 and the connections to the lenses and nose piece are shown in FIG. 1G. Each of the two ear supports 164 attach to one of the rear lenses in the manner shown in FIG. 13D.

Angular Adjustment with Pivoting Front Lenses

FIGS. 14A-14G are drawings showing features of a preferred embodiment providing angular adjustment of the lenses of a set of eyeglasses where front lenses pivot relative to back lenses. In this embodiment both rear lenses are rigidly attached to the nose piece and hinge-like to ear supports 164. The front lenses pivot about pivot 150A. Tab units 166 attached to the front lenses limit range of movement of the front lenses.

Angular Adjustment with Special Pivot Mechanism

Figure 15A:
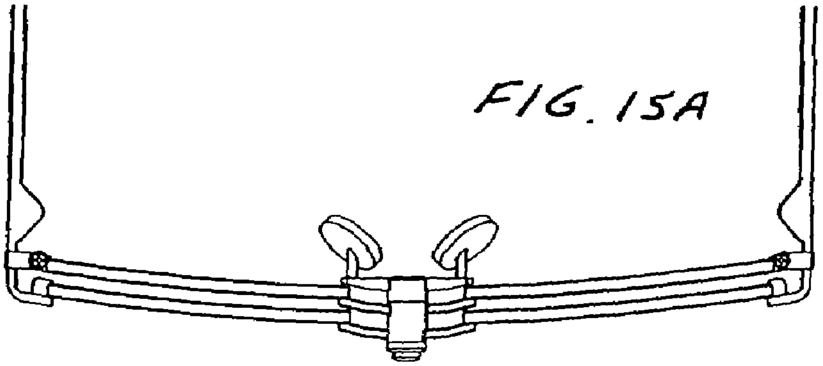
FIGS. 15A through 15H show features of a third frame design for pivotal lens motion.
Figure 15B:
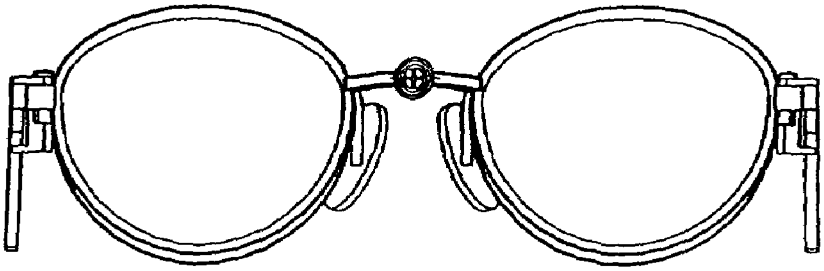
Figure 15C:
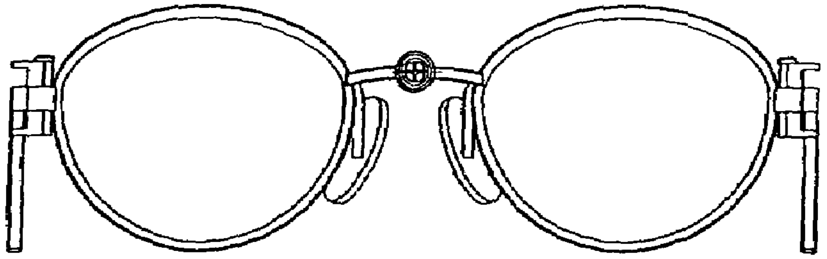
Figure 15D:
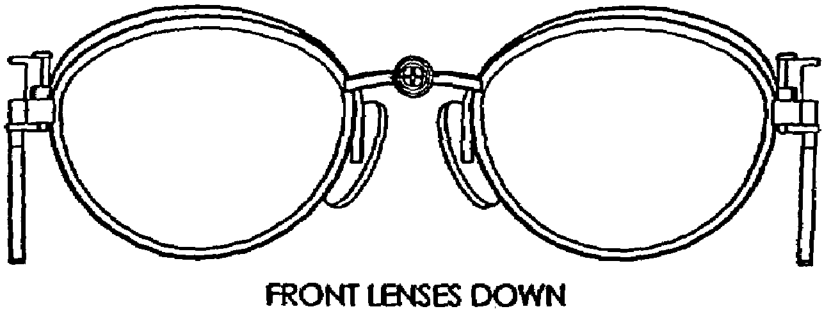
Figure 15E:
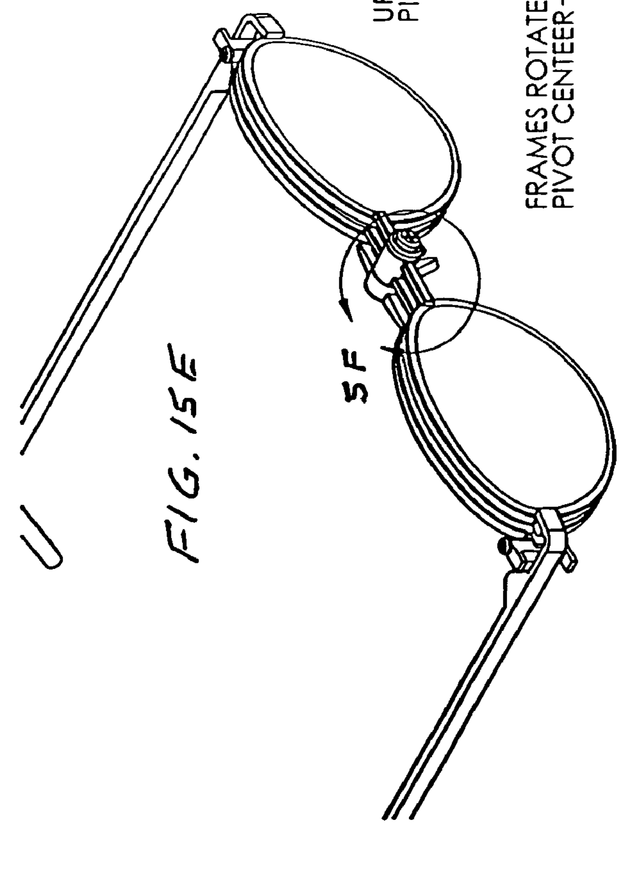
Figure 15F:
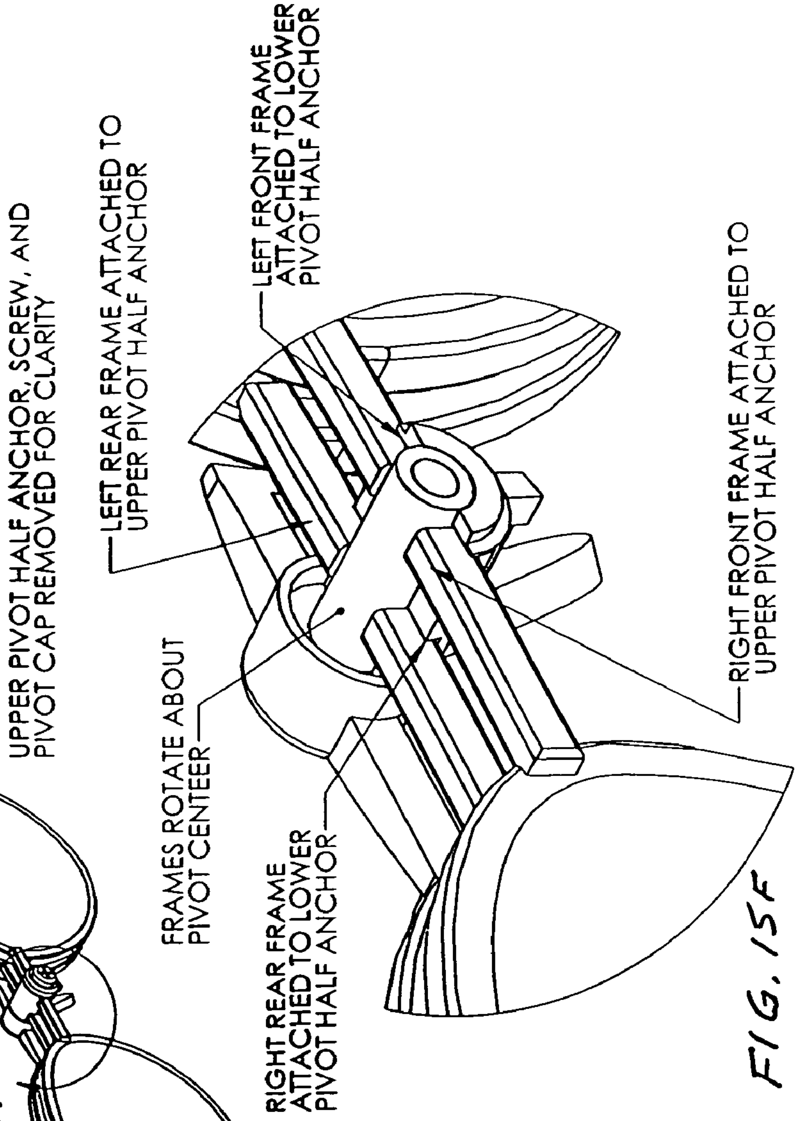
Figure 15G:
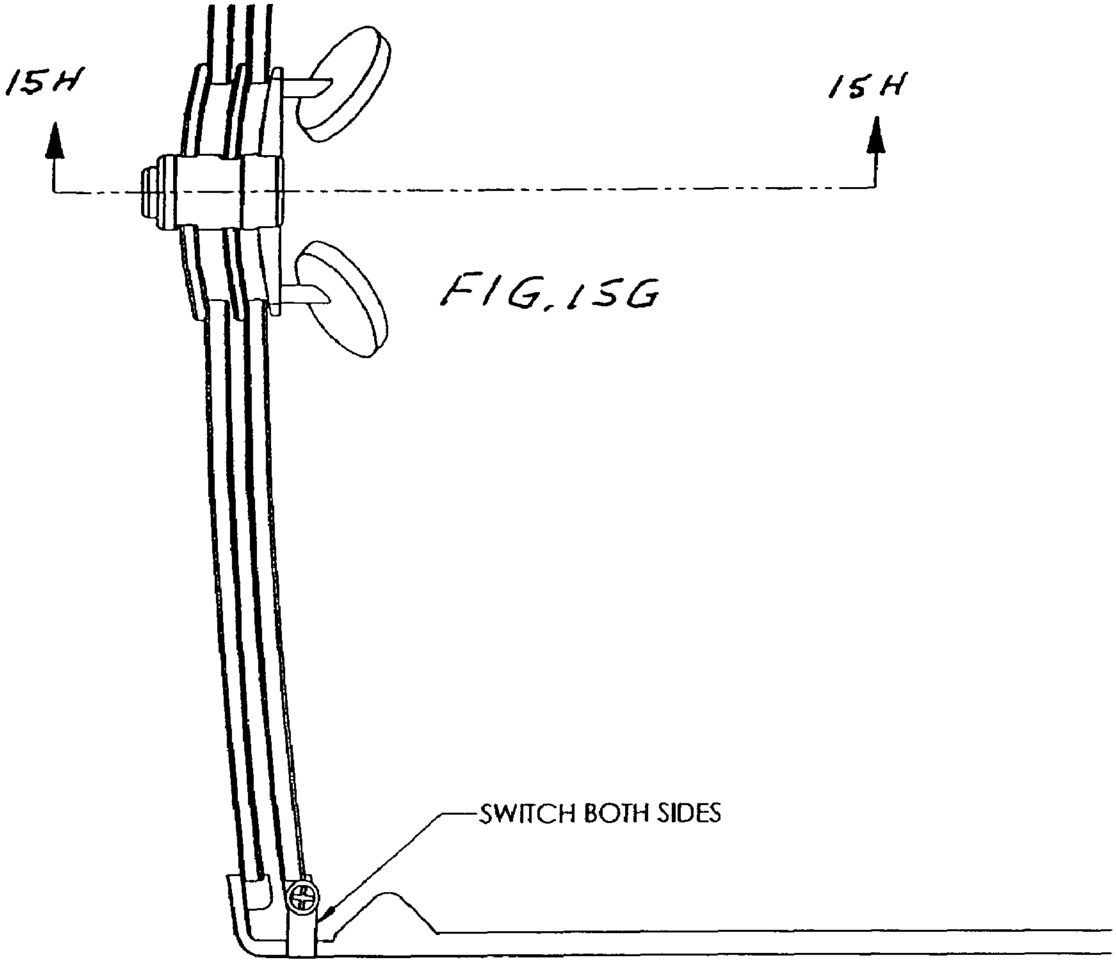
Figure 15H:
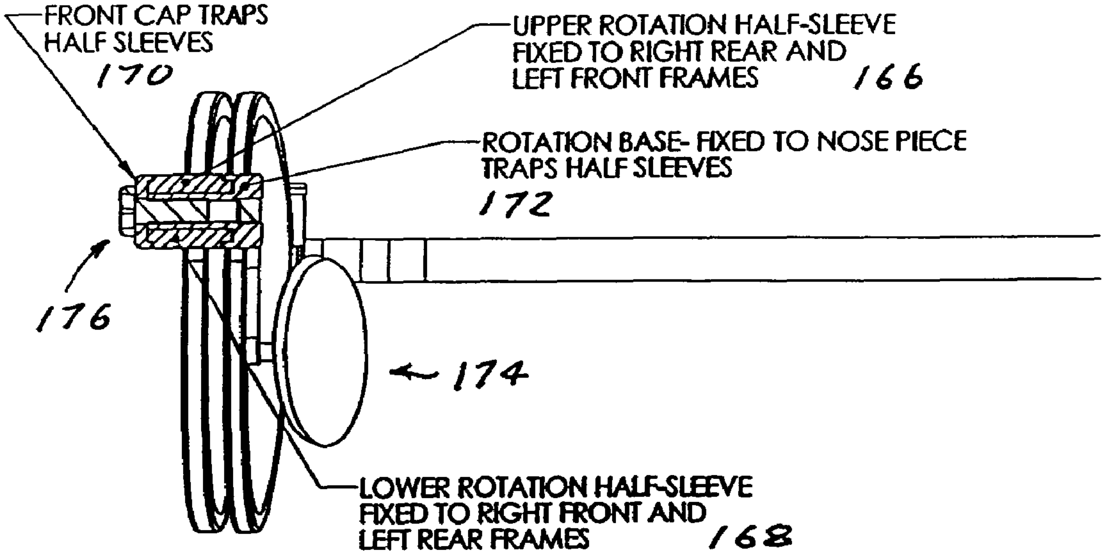

FIGS. 15A-15H show detailed design features of a preferred embodiment having a special pivot mechanism that can be easily disassemble to permit cleaning of the lens elements. In this design, which is similar the design shown in FIGS. 13A-13G, the pivot mechanism (as shown in FIG. 15H) is provided by two half-sleeves 166 and 168 which are trapped by front cap 170 and which rotate about a rotation base 172 that is fixed to nose piece 174, with the right front and left rear lens elements rigidly attached on one half-sleeve and the left front and right rear lens elements rigidly attached on the other half-sleeve. The sleeves being trapped by the base and the end cap can only rotate. Some friction is preferably built in to hold the positions of the lens elements when no force is being applied. Additional friction can be applied by tightening Philips screw 176 which can also be removed to permit disassembly and cleaning the inside surfaces of the lens elements.

Advantages of Adjustment about a Pivot Point

The special surface design to provide adjustable focus about a pivot point is quite a bit more complicated than the surface design for a linear adjustment. However, as indicated in FIGS. 13A-13G movement of the lenses about a pivot point greatly simplifies the frame design to accomplish the relative lens movements as compared to sliding the lenses linearly in a linear direction as proposed in Alvarez patents. With the pivot type embodiments, existing frame designs can be used along with a simple pivot type mechanism as shown in FIG. 13G. The pivot design as shown in FIG. 13A-13G assures that all relative movements are perfectly symmetrical. This is difficult to accomplish with the linear motion techniques.

Automatic Adjustments of Focus

Several prior art patents have proposed techniques for automatic adjustments of the focus of eyeglass lenses. These techniques attempt to determine the distance to the viewed object and then automatically adjust the focus of the lenses in the eyeglasses based on stored information so that the object is in focus for the wearer. These techniques include range finders and small camera viewing both eyes to detect distances between the pupils and small processors and drivers to calculate distances and control focus based on the calculated distances. Cues from the wearer can also be used as a signal to provide an automatic adjustment of the focus. For example, a wink of only the right eye could be a cue to increase the length of focus and a wink of only the left eye could be a cue to decrease it. Head motion or eyebrow motion could also be used as a cue. Additional equipment would have to be added to the basic embodiment described above. Needed would be a motor and actuator with a power source to provide the lateral displacement provided in the example by adjustment screw 20. A small processor could be used to translate cues provided by the range finder, camera or wearer into instructions for the motor and actuator. Specific equipment of this general type for determining distances to viewed objects is described in the patents referenced in the background section.

As an example, a system can be used to measure inter-pupil distance. This system would provide a determination of the distance of the object that the eyes are pointed at. If an object is far away, each eye is pointed in approximately the same direction. As the object moves closer, the eyes start to cross so that both are pointed at the object. Small cameras can take digital images of each of the eyes and a miniature digital processor can compute the offset distance that maximizes the correlation of the two images. This offset, when added to the camera separation, yields inter-pupil distance. This inter-pupil distance can be converted by the same digital processor into a range to the object, which is then converted to an offset distance for the sliding lenses. The processor then commands the motor/actuator to position the lenses in the proper position.

Using the Present Invention to Make Fixed-Lens Eyeglasses

The techniques described in that application can be applied to greatly reduce the cost of providing eyeglasses. These techniques reduce needed inventory stocks of lenses to meet patient's needs for focus and astigmatism correction. These techniques are described below:

Sets of lenses are prepared as described in the parent application, except the lenses are set during a second stage of a manufacturing process and not adjusted. The objective of this is to be able to manufacture many different lens prescriptions with a small number of parts. The parts will be able to cover a range of focus settings. Preferably there will be relatively small number of certain, coarsely spaced, focus powers on lens pairs that are maintained in stock. Applicant believes that most eye-care facilities will choose to stock about 10 to 20 different focus power lens pairs. Fine-tuning will be accomplished by displacing the two lenses in the lens pair. The lens pair is then cut and placed into the frames. This process provides for the correction of focus but not astigmatism.

To also provide for the correction of focus and astigmatism a lens pair closest to the desired focus power is chosen from stock as described in 1) above. Adjustments are made in a first direction (the x-direction) to provide the desired focus. Then adjustments are made in a y-direction perpendicular to the x-direction to apply astigmatism correction to the lenses. In this case, we need to add a fourth equation to the previous three equations in the translating x-y form:

$$(\partial^3 t/\partial x^3)|_{(x,y)=(0,0)}=2A,$$

$$(\partial^3 t/\partial x\partial y^2)|_{(x,y)=(0,0)}=2A,$$

$$(\partial^3 t/\partial x^2\partial y)|_{(x,y)=(0,0)}=0,$$

$$(\partial^3 t/\partial y^3)|_{(x,y)=(0,0)}=0.$$

This last constraint slightly restricts the solution, we now require:

$$(\partial^3 F(y)/\partial y^3)|_{(x,y)=(0,0)}=0.$$

in the thickness formula $$t=A(xy^2+\tfrac{1}{3}x^3)+Bx^2+Cxy+Dx+E+F(y)+F1(x,y)x^4+F2(y)x^3y+F3(y)x^2y^2+F4(y)xy^3.$$

As an alternative, matched spherical surfaces can be on the inside. After adjustment, the lenses are glued together (preferably with refractive index matching glue) as a single unit with no air gap. This should provide a superior mechanical structure, and the internal surfaces are removed, but the optical performance may be somewhat inferior.

Computer Simulations

Various optical designs based on the present invention have been tested with computer simulations. Specific simulations were made using computer aided design software available from Zemax Development Corporation with offices in Bellevue, Wash. Several simulations were-made for lens pairs with optical powers of 0 diopter, +2 diopters, and −2 diopters at angles of 0 degrees, 30 degrees up, 30 degrees down, 30 degrees left and 30 degrees right. In all cases the simulations show results that are about the same or better than standard fixed focus prior art spectacle lenses for correcting focus. Examples of these simulations are discussed above in the section entitled “ZEMAX Optimization” shown in FIGS. 2A through 2C and in FIG. 17.

Variations

The lens can move up and down, side to side, or at any other direction predominately perpendicular to the wearer's line of sight. The moving lenses for each eye can move in common (best for up and down) or in different directions such as out and in away from the nose. Also, both lenses for each eye can move at the same time in opposite directions. Optimized surfaces can be applied to any of the four surfaces of the two lenses; however, it is best to optimize all of the surfaces.

Lens units of the present invention can be utilized in many applications other than for eyeglasses. The concepts can be applied to almost any situation where adjustable focusing is needed. These include microscopes, cameras, copy machines and magnifying glasses.

The present invention can be used for eye examinations. Lateral adjustments can be provided with a micrometer operated by the patient to focus his eyes at various distances and having a read-out on a computer screen indicating lens power needed for focusing at those distances. Such devices might be provided at drug stores selling inexpensive lenses for reading. In addition the lenses might be used to confirm a prescription.

The pivot location does not have to be between the wearer's eyes. For example, each lens unit could be designed with a pivot location at the outside edge of the eyeglasses or at the top or bottom of the lens units. There may be situations where only one of the lens units of a pair of eyeglasses would be designed for an adjustable focus.

Manufacturing techniques that could be employed include: machining (such as with numerically controlled equipment), molding, casting, curing and use of gradient index lenses for which thickness is replaced by “optical path length” defined by:

$$(n-1)*(\text{thickness})$$

where n is the index of refraction. Potential range finders include optical, laser and acoustic. Cues for automatic changing of focus could include blinking, eyebrow motion, head motion, and hand switches.

In the preferred embodiments and in the claims, surface shapes are sometimes defined with mathematical equations. Minor modifications to the equations can be made without causing variations that could significantly adversely affect the performance of the lens systems. Therefore, in his claims Applicant has used the term “approximately” in connection with these equations with the intention of claiming systems that utilize surfaces that are defined by equations that are not exactly the same as the referenced equations but achieve the same result within the tolerance of the lens system as it is being applied. Also, when he refers to A for one lens element being the complement, or “substantially the complement”, of A for the other lens element, he means that their magnitudes are so close to each other that any difference results in effects that are within the tolerance of the lens system to which the equations are being applied. When applied to eyeglasses the applicable tolerance is the ability of the human eye to detect a difference.

The reader should understand that the present invention is not limited to the specific embodiments described above and that many modifications and additions or deletions could be made to those described embodiments. Therefore, the scope of the invention should be determined by the appended claims and their legal equivalents.

What is claimed is:

1. Adjustable focus eyeglasses comprising:

A) two lens units, each lens unit comprising a first lens element and a second lens element, and each lens element having a specially designed thickness profile wherein the designs of the thickness profiles are chosen such that small adjustments of the relative positions of the two lenses in directions perpendicular or approximately perpendicular to a viewing direction results in changes in the combined focus of the two lenses of the lens unit;

B) an eyeglasses frame system for holding said lens elements, said frame system comprising an adjustment mechanism for adjustment of the position of at least one of the two lens elements relative to the other in a direction generally perpendicular to a viewing direction;

wherein the thickness profiles are approximately given by the following three equations defining a thickness profile function for each of the two lens elements:

$$((\alpha v+1)^{-2}\partial^3 t/\partial u^3+\alpha(\alpha v+1)^{-1}\partial^2 t/\partial v\partial u)|_{(u,v)=(0,0)}=2A$$

$$(\partial^3 t/\partial v^2\partial u)|_{(u,v)=(0,0)}=2A$$

$$((\alpha v+1)^{-1}\partial^3 t/\partial v\partial u^2-\alpha(\alpha v+1)^{-2}\partial^2 t/\partial u^2)|_{(u,v)=(0,0)}=0,$$

where A for one lens element to be the complement, or substantially the complement, of the other lens element and where the thickness profile functions continuous, and the derivatives up to at least third order are continuous.

2. The eyeglasses as in claim 1 wherein the solutions to the thickness profile functions are approximately given by:

$$t=[uv^2+2(\alpha v+1)(\alpha u-\sin(\alpha u))/\alpha^3]+B[2(\alpha v+1)(1-\cos(\alpha u))/\alpha^2)]+C[v\sin(\alpha u)/\alpha-(\alpha u-\sin(\alpha u))/\alpha^2)]+Du+E+F(v)+F1(u,v)u^4+F2(v)u^3v+F3(v)u^2v^2+F4(v)uv^3,$$

where

F(v), F1(u,v), F2(v), F3(v) and F4(v)

are any functions over the area of the lenses for which derivatives up to at least third order are continuous and at least one of F1(u,v), F2(v), F3(v) and F4(v) is non zero.

3. The eyeglasses as in claim 2 wherein said relative motion is linear and the thickness profile functions are approximately given by:

$$(\partial^3 t/\partial x^3)|_{(x,y)=(0,0)}=2A$$

$$(\partial^3 t/\partial x\partial y^2)|_{(x,y)=(0,0)}=2A$$

$$(\partial^3 t/\partial x^2\partial y)|_{(x,y)=(0,0)}=0$$

with the solution for each of the two lens elements being $$t=A(xy^2+\tfrac{1}{3}x^3)+Bx^2+Cxy+Dx+E+F(y)+F1(x,y)x^4+F2(y)x^3y+F3(y)x^2y^2+F4(y)xy^3$$

where at least one of F1, F2, F3 and F4 is non zero.

4. The eyeglasses as in claim 2 wherein said relative motion is pivotal and the thickness profile functions are approximately given by:

$$r_0^{-1}(r^{-2}\partial^3 t/\partial\theta^3+r^{-1}\partial^2 t/\partial r\partial\theta)|_{(r,\theta)=(r_0,0)}=2A$$

$$r_0^{-1}(\partial^3 t/\partial r^2\partial\theta)|_{(r,\theta)=(r_0,0)}=2A$$

$$r_0^{-1}(r^{-1}\partial^3 t/\partial r\partial\theta^2-r^{-2}\partial^2 t/\partial\theta^2)|_{(r,\theta)=(r_0,0)}=0$$

with the solution for each of the two lens elements being:

$$t=Ar_0[(r^2+r_0^2)\theta-2rr_0\sin(\theta)]+B2r_0r(1-\cos(\theta))+Cr_0[r\sin(\theta)-r_0\theta]+Dr_0\theta+E+F(r)+F1(r,\theta)r_0^4\theta^4+F2(r)r_0^3(r-r_0)\theta^3+F3(r)r_0^2(r-r_0)^2\theta^2+F4(r)r_0(r-r_0)^3\theta$$

where at least one of F1, F2, F3 and F4 are non zero.

5. The eyeglasses as in claim 3 wherein parameters and functions are chosen to optimize at least six lens properties chosen from the following list of lens properties:

a. on-axis variable optical power
b. off-axis variable optical power
c. on-axis residual aberration
d. off-axis residual aberration
e. magnitude of motion required for the variable power
f. minimum lens thickness
g. total weight
h. front surface appearance
i. minimum lens spacing
j. maximum lens spacing
k. eye to inner surface distance
l. eye to outer surface distance
m. total wedge
n. variable wedge
o. matching of wedge between the eyes
p. insensitivity to exact eye location
q. prescription base correction
r. at least one surface pre-defined to match a stock shape.

6. The eyeglasses as in claim 4 wherein parameters and functions are chosen to optimize at least six lens properties chosen from the following list of lens properties:

a. on-axis variable optical power
b. off-axis variable optical power
c. on-axis residual aberration
d. off-axis residual aberration
e. magnitude of motion required for the variable power
f. minimum lens thickness
g. total weight
h. front surface appearance
i. minimum lens spacing
j. maximum lens spacing
k. eye to inner surface distance
l. eye to outer surface distance
m. total wedge
n. variable wedge
o. matching of wedge between the eyes
p. insensitivity to exact eye location
q. prescription base correction
r. at least one surface pre-defined to match a stock shape.

7. The eyeglasses as in claim 3 wherein parameters and functions are chosen to optimize at least ten lens properties chosen from the following list of lens properties:

a. on-axis variable optical power
b. off-axis variable optical power
c. on-axis residual aberration
d. off-axis residual aberration
e. magnitude of motion required for the variable power
f. minimum lens thickness
g. total weight
h. front surface appearance
i. minimum lens spacing
j. maximum lens spacing
k. eye to inner surface distance
l. eye to outer surface distance
m. total wedge
n. variable wedge
o. matching of wedge between the eyes
p. insensitivity to exact eye location
q. prescription base correction
r. at least one surface pre-defined to match a stock shape.

8. The eyeglasses as in claim 4 wherein parameters and functions are chosen to optimize at least ten lens properties chosen from the following list of lens properties:

a. on-axis variable optical power
b. off-axis variable optical power
c. on-axis residual aberration
d. off-axis residual aberration
e. magnitude of motion required for the variable power
f. minimum lens thickness
g. total weight
h. front surface appearance
i. minimum lens spacing
j. maximum lens spacing
k. eye to inner surface distance
l. eye to outer surface distance m. total wedge n. variable wedge o. matching of wedge between the eyes p. insensitivity to exact eye location q. prescription base correction r. at least one surface pre-defined to match a stock shape.

9. The eyeglasses as in claim 1 wherein said adjustment mechanism is adapted to move both of the lens elements in each lens unit relative to each other so as to adjust the focusing power of the lens unit.

10. The eyeglasses as in claim 1 wherein each of said first and said second lens elements in said each of said at least one lens unit are fixed relative to each other after an adjustment of their relative positions in order to produce a desired combined focusing power.

11. The eyeglasses of claim 1 wherein said adjustment mechanism is adapted to be operated manually.

12. The eyeglasses of claim 1 wherein said lens adjustment mechanism is a motor driven lens adjustment mechanism.

13. The eyeglasses of claim 12 wherein said motor driven lens adjustment mechanism is based on a measured distance to a viewed object.

14. The eyeglasses of claim 12 wherein said motor driven lens adjustment mechanism is based on measurements of the wearer's eye positions.

15. The eyeglasses of claim 12 wherein said motor driven lens adjustment mechanism is based on special cues from the wearer.

16. The eyeglasses as in claim 11 wherein said adjustment mechanism is adapted to be operated by a finger force against a friction force to slide one lens element in each lens unit relatively to the other lens element in the lens unit.

17. The eyeglasses as in claim 11 wherein said frame system comprises a support frame and two separate frames holding the lenses and said adjustment mechanism is adapted to provide a pivot about pivot points on the earpiece of the support frame.

18. The eyeglasses as in claim 11 wherein said frame system comprises a support frame with two earpieces and a separate frame wherein two rear lenses are mounted in the support frame and two front lenses are mounted in the separate frame and the adjustment mechanism is adapted to provide a pivots of the separate frame about points on the earpieces of the support frame.

19. The eyeglasses as in claim 11 wherein said adjustment mechanism comprises a pivot bar adapted to produce lateral displacement of the lenses relative to each other when the torsion bar is twisted.

20. The eyeglasses as in claim 11 wherein said adjustment mechanism comprises a guide means for guiding the movement of the lens elements in each lens unit to assure that the movement of each lens element is in a direction approximately perpendicular to a viewing direction.

21. The eyeglasses as in claim 20 wherein said direction maps an arc of a circle defining a lens movement radius.

22. The eyeglasses as in claim 11 wherein said adjustment mechanism is adapted to move the two lens elements in each lens unit in opposite directions.

23. The eyeglasses as in claim 22 wherein said opposite directions are opposite directions on a curve.

24. The eyeglasses as in claim 23 wherein said curve is a circle.

25. The eyeglasses as in claim 24 wherein said adjustment also comprises a nose piece adapted to assure that relative movement of the two lens element in each lens unit is in opposite directions from a central point.

26. The eyeglasses as in claim 25 wherein said central point is approximately co-aligned with a line of sight from an eye of a wearer of the lens system.

27. The eyeglasses as in claim 11 wherein said adjustment mechanism comprises an adjusting element chosen from the follow group of adjusting elements: (1) a knob, (2) a cam, (3) squeezable off-set arms, (4) a lever, (5) gears, (6) a screw (7) a snap and (8) a spring loaded attachment.

28. The eyeglasses as in claim 4 wherein said adjustment mechanism comprises a pivot mechanism.

29. The eyeglasses as in claim 28 wherein said adjustment mechanism further comprises four pivot arms each of the four pivot arms connecting one lens element to the one pivot mechanism.

30. The eyeglasses as in claim 29 wherein a front lens element of a right lens unit is rigidly connected via two of said four pivot arms and a first pivotable portion of the one pivot mechanism to a rear lens element of a left lens unit and a front lens element of the left lens unit is rigidly connected via two of said four pivot arms and a second pivotable portion of the one pivot mechanism to a rear lens element of said right lens unit.

31. The eyeglasses as in claim 29 wherein a front lens element of a right lens unit is rigidly connected via two of said four pivot arms and a first pivotable portion of the one pivot mechanism to a front lens element of a left lens unit and a rear lens element of the right lens unit is rigidly connected via two of said four pivot arms and a second pivotable portion of the one pivot mechanism to a rear lens element of said left lens unit.

32. The eyeglasses as in claim 29 wherein a front lens element of the right lens unit is pivotably connected via two of said four pivot arms and the one pivot mechanism to a rear lens element of the right lens unit and a front lens element of the left lens unit is pivotably connected via two of said four pivot arms and the one pivot mechanism to a rear lens element of said left lens unit.

33. The eyeglasses as in claim 1 wherein the two lens units define a right lens unit and a left lens unit and the right lens unit defines a right lens unit optical axis and the left lens unit defines a left lens unit optical axis and said adjustment mechanism comprises a single pivot mechanism located midway between the left lens unit optical axis and the right lens unit optical axis.

34. The eyeglasses as in claim 28 and further comprising at least two finger operated pivot adjustment tabs to adjust the focus of each of the two the lens units.

35. The eyeglasses as in claim 34 wherein the tabs are adapted to be operated with fingers of one hand.

36. The eyeglasses as in claim 1 wherein said adjustment mechanism comprises a motor driven pivot adjustment mechanism.

37. The eyeglasses as in claim 28 and further comprising a pivot position stabilizing means for stabilizing the pivot position of the lens elements at a desired focus.

38. The eyeglasses as in claim 37 wherein said pivot position stabilizing means comprises at least one detent.

39. The eyeglasses as in claim 37 wherein said pivot position stabilizing means comprises frictional force means for stabilizing the position by frictional force.

40. The eyeglasses as in claim 37 wherein said pivot position stabilizing means comprises at least one magnet stabilizing the position by magnetic force.

41. The eyeglasses as in claim 37 wherein said pivot position stabilizing means is incorporated into said pivot adjustment mechanism.

42. The eyeglasses as in claim 27 and further comprising two nose pads with one of said two nose pads is attached to one of said front or rear left lens elements and the other of said nose pads is attached to said front or rear right lens elements.

43. The eyeglasses as in claim 1 wherein at least one of said left and right lens units comprises a static aberration.

44. The eyeglasses as in claim 43 wherein said static aberration is a prescription surface.

45. The eyeglasses as in claim 43 wherein the static aberration is applied to a single surface of the front or rear lens element of said at least one lens unit.

46. The eyeglasses as in claim 43 wherein the static aberration is applied to a more than one surface of the front or rear lens element of said at least one lens unit.

47. The eyeglasses as in claim 1 wherein each lens element defines a front and rear surface and comprises a base shape applied to both front and rear surfaces.

48. The eyeglasses as in claim 47 wherein the base shape defines a bow.

49. The eyeglasses as in claim 1 wherein each lens element comprises a lens design code optimized thickness.

50. The eyeglasses as in claim 1 wherein each lens unit comprises a power base to which the specialized complementary surfaces are in addition.

51. The lens system as in claim 10 wherein each of said first and said second lens elements in said each of said two lens unit are fixed relative to each other after an adjustment of their relative positions in order to produce a desired combined focusing power and combined astigmatism.

52. The lens system as in claim 11 wherein said frame system comprises a support frame and two separate frames holding the lens elements wherein the adjustment mechanism is adapted to translate the two separate frames in a primarily horizontal direction.

53. The lens system as in claim 11 wherein said frame system comprises a support frame for holding two lens elements and a separate frame for holding two lens elements and the adjustment mechanism is adapted to translate the separate frame with its two lens elements in a primarily horizontal direction.

* * * * *